US012199305B2

(12) United States Patent
Villanueva et al.

(10) Patent No.: US 12,199,305 B2
(45) Date of Patent: Jan. 14, 2025

(54) AIRCRAFT ENERGY STORAGE VENTING SYSTEM

(71) Applicant: Joby Aero, Inc., Santa Cruz, CA (US)

(72) Inventors: Ernest Villanueva, San Francisco, CA (US); Austin Lawrence Newman, Castro Valley, CA (US); Michael Patrick Tucker, Palo Alto, CA (US); Robert Thodal, Santa Cruz, CA (US); Christopher Cochran, Santa Cruz, CA (US); Matthew Clyde Cusimano, San Francisco, CA (US); Edward Stilson, Santa Cruz, CA (US); Ahsan Mehmood, Santa Clara, CA (US); Edward Thomas Sweet, San Francisco, CA (US)

(73) Assignee: Joby Aero, Inc., Santa Cruz, CA (US)

(*) Notice: Subject to any disclaimer, the term of this patent is extended or adjusted under 35 U.S.C. 154(b) by 845 days.

(21) Appl. No.: 17/349,863

(22) Filed: Jun. 16, 2021

(65) Prior Publication Data

US 2021/0391627 A1    Dec. 16, 2021

Related U.S. Application Data

(60) Provisional application No. 63/039,824, filed on Jun. 16, 2020.

(51) Int. Cl.
*B64D 27/24* (2024.01)
*H01M 10/625* (2014.01)
(Continued)

(52) U.S. Cl.
CPC ........ *H01M 50/3425* (2021.01); *B64D 27/24* (2013.01); *H01M 10/625* (2015.04); *H01M 50/358* (2021.01); *H01M 2220/20* (2013.01)

(58) Field of Classification Search
CPC .............. H01M 50/358; H01M 50/3425
See application file for complete search history.

(56) References Cited

U.S. PATENT DOCUMENTS 4,468,440 A     8/1984   Evjen
8,967,529 B1 *  3/2015   Bennett ............... H01M 50/204
                                                      446/57
(Continued)

OTHER PUBLICATIONS

"International Application Serial No. PCT US2021 037710, International Search Report mailed Sep. 28, 2021", 2 pgs.
(Continued)

*Primary Examiner* — Steven S Anderson, II
(74) *Attorney, Agent, or Firm* — SCHWEGMAN LUNDBERG & WOESSNER, P.A.

(57) ABSTRACT

An aircraft includes a battery pack mounted inside the aircraft, a vent coupled between the battery pack and a surface of the aircraft to at least partly define a vent path between the battery pack and the surface of the aircraft, and a burst membrane located in the vent path. The vent may be coupled to a rear upper portion of a wing or to an outboard side of a nacelle. The aircraft may also include a flexible coupling between the vent and the surface of the aircraft. The aircraft may also include a fairing over a vent outlet to provide a smooth surface for the vent outlet. The battery pack may include battery modules and an enclosure, the battery modules and the enclosure defining paths along which discharge from a thermal event can flow towards the vent.

20 Claims, 21 Drawing Sheets

(51) Int. Cl.
*H01M 50/342* (2021.01)
*H01M 50/358* (2021.01)

(56) References Cited

U.S. PATENT DOCUMENTS

| | | |
|---|---|---|
| 10,734,622 B2 * | 8/2020 | Plessner .............. H01M 50/333 |
| 2012/0070706 A1 | 3/2012 | Miyazaki et al. |
| 2014/0242896 A1 * | 8/2014 | Plessner ................ B64C 1/1453 |
| | | 454/71 |
| 2015/0093608 A1 | 4/2015 | Seong et al. |
| 2015/0325827 A1 * | 11/2015 | Dittmar ............... H01M 50/358 |
| | | 137/15.01 |
| 2016/0107756 A1 * | 4/2016 | Liske ........................ B64C 7/02 |
| | | 244/54 |
| 2019/0067659 A1 | 2/2019 | Karulkar et al. |
| 2019/0162340 A1 | 5/2019 | Harmuth et al. |
| 2020/0339010 A1 | 10/2020 | Villanueva et al. |
| 2021/0170908 A1 | 6/2021 | Villanueva et al. |
| 2021/0347473 A1 * | 11/2021 | Dietrich ................ B64C 13/503 |

OTHER PUBLICATIONS

"International Application Serial No. PCT US2021 037710, Written Opinion mailed Sep. 28, 2021", 6 pgs.

\* cited by examiner

AIRCRAFT ENERGY STORAGE VENTING SYSTEM

CROSS-REFERENCE TO RELATED APPLICATIONS

This application claims the benefit of U.S. Provisional Patent Application No. 63/039,824 filed 16 Jun. 2020, the contents of which are incorporated herein in its entirety as if explicitly set forth.

TECHNICAL FIELD

This invention relates generally to the aviation field, and more specifically to a new and useful energy storage system in the aviation field.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
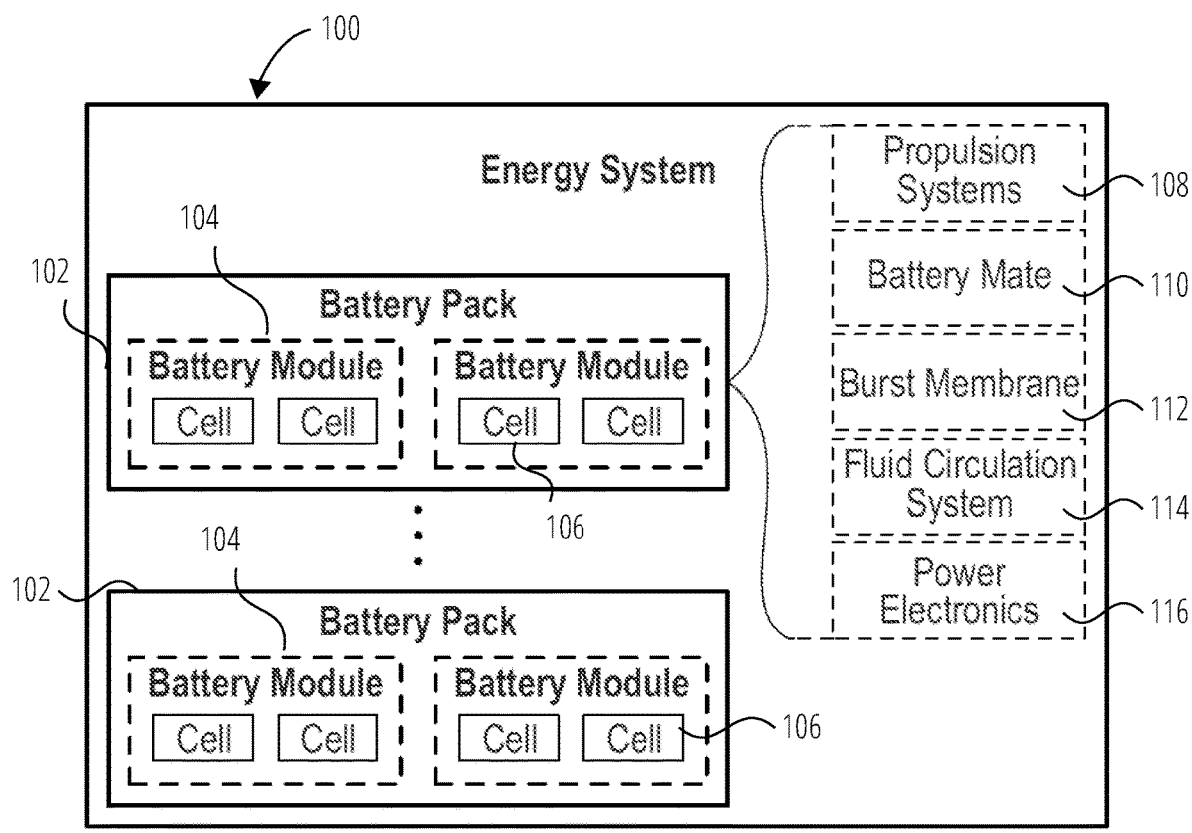
FIG. 1 is a schematic view of an aircraft energy-storage system according to one example.

The following description of examples of the invention is not intended to limit the invention to these examples, but rather to enable any person skilled in the art to make and use this invention.

In one aspect, an aircraft includes a battery pack mounted inside the aircraft, a vent coupled between the battery pack and a surface of the aircraft to at least partly define a vent path between the battery pack and the surface of the aircraft, and a burst membrane located in the vent path. The vent may be coupled to a rear upper portion of a wing or to an outboard side of a nacelle. The aircraft may also include a flexible coupling between the vent and the surface of the aircraft. The aircraft may also include a fairing over a vent outlet to provide a smooth surface for the vent outlet.

The battery pack may include battery modules and an enclosure, the battery modules and the enclosure defining paths along which discharge from a thermal event can flow towards the vent.

The burst membrane may be selected from the group consisting of a rupture disk, a pressure safety disc, a burst disc, a burst diaphragm and a pressure relief valve.

The aircraft may also include a plurality of wing-mounted battery packs, a plurality of nacelle-mounted battery packs, a plurality of wing-mounted vents coupled between the wing-mounted battery packs battery pack and an external surface of a wing of the aircraft, a plurality of nacelle-mounted vents coupled between the nacelle-mounted battery packs battery pack and an external surface of a nacelle of the aircraft. The nacelle-mounted battery packs may include lower and upper rows of battery packs.

The vent may be coupled to the surface via a flexible coupling. The flexible coupling may be an elastomeric expansion joint that permits relative motion between the battery pack and the surface of the aircraft. The battery pack may be coupled to a fore-aft structure in the wing or the battery pack may be coupled to a transverse structure in the nacelle.

In one aspect, an outlet of the vent is coupled to a nacelle facing away from a fuselage of the aircraft, or the vent is coupled to a rear upper surface of a wing.

In one aspect, an aircraft includes a battery pack mounted inside the aircraft, the battery pack including a number of battery modules and an enclosure surrounding the battery modules, a vent coupled between the battery pack and a surface of the aircraft to at least partly define a vent path between the battery pack and the surface of the aircraft, and a burst membrane located in the vent path, where the battery modules and the enclosure define pathways to the vent. The vent is may be located on one side of the battery pack and the vent pathways may traverse the battery pack from an opposite side of the battery pack to the vent. The vent may be a manifold vent coupling a number of battery modules to a surface of the aircraft.

The vent may be positioned to direct discharge from a battery thermal event away from a fuselage of the aircraft. The outlets of wing-mounted vents may be coupled to a rear upper portion of a wing and outlets of nacelle-mounted vents may be coupled to an outboard surface of the nacelle.

Other technical features may be readily apparent to one skilled in the art from the following figures, descriptions, and claims.

FIG. 1 is a schematic view of an aircraft energy-storage system 100 in accordance with one example. As shown, the system 100 includes one or more battery packs 102. Each battery pack 102 may include one or more battery modules 104, which in turn may comprise a number of cells 106.

Typically associated with a battery pack 102 are one or more propulsion systems 108, a battery mate 110 for connecting it to the system 100, a burst membrane 112 as part of a venting system, a fluid circulation system 114 for cooling, and power electronics 116 for regulating delivery of electrical power (from the battery during operation and to the battery during charging) and to provide integration of the battery pack 102 with the electronic infrastructure of the system 100. As discussed in more detail below, the propulsion systems 108 may comprise a plurality of rotor assemblies.

The electronic infrastructure and the power electronics 116 can additionally or alternately function to integrate the battery packs 102 into the energy system of the aircraft. The electronic infrastructure can include a Battery Management System (BMS), power electronics (HV architecture, power components, etc.), LV architecture (e.g., vehicle wire harness, data connections, etc.), and/or any other suitable components. In a first variant, portions of the electronic infrastructure are distributed within the battery (e.g., within a monolithic battery structure). In a second variant, portions of the electronic infrastructure (e.g., power electronics) can be packaged separately from the battery, which as within a dedicated enclosure. Packaging portions of the electronic infrastructure in dedicated enclosures can enable power electronics to be line replaceable units (LRU) and/or can enable additional vibration isolation for vibration-sensitive electronics (e.g., HV power electronics). The electronic infrastructure can include inter-module electrical connections, which can transmit power and/or data between battery packs and/or modules. Inter-modules can include bulkhead connections, bus bars, wire harnessing, and/or any other suitable components. Inter-module electrical connections can be established before battery mounting, during battery mounting (e.g., automatically as a part of, included as part of the installation process), after mounting, synchronously with mounting, asynchronously with mounting, and/or with any suitable temporal relationship or dependence to the mounting process.

However, the electronic infrastructure can include any other suitable features and/or can be otherwise suitably implemented.

The battery pack 102 functions to store electrochemical energy in a rechargeable manner. The system 100 can include any suitable number of battery packs, such as 0, 1, 2, 3, 4, more than 4, and/or any other suitable number of battery packs as a part of a complete energy system. Battery packs 102 can be arranged and/or distributed about the aircraft in any suitable manner. Preferably, battery packs are arranged proximal to a vertical lateral plane of the aircraft, but can be otherwise suitably arranged. Battery packs can be arranged within wings (e.g., inside of an airfoil cavity), inside nacelles, and/or in any other suitable location on the aircraft. In a specific example, the system includes a first battery pack within an inboard portion of a left wing and a second battery pack within an inboard portion of a right wing. In a second specific example, the system includes a first battery pack within an inboard nacelle of a left wing and a second battery pack within an inboard nacelle of a right wing. In a third example, one or more battery packs 102 include a plurality of battery modules 104.

The battery pack 102 can include or exclude the battery pack housing/enclosures (e.g., closeouts), can be assembled into the aircraft separately from the battery pack housing/enclosures, and/or can be otherwise suitably configured.

The battery pack 102 can include any suitable cells of any suitable type, chemistry, voltage, maximum C-rate, capacity, and/or other characteristics. Battery cells 106 can be the same or different across various battery modules/packs, or within the same battery module/pack. Battery cell types (e.g., geometries) can include cylindrical, button, prismatic, pouch, and/or any other suitable cell geometries.

The battery pack 102 can include any suitable mounting and/or attachment mechanism, which functions to mechanically couple the battery pack 102 to the aircraft. The mounting mechanism can utilize any suitable fasteners, which can be include mechanical fasters such as: non-permanent fasteners, permanent fasteners, nuts, bolts, rivets, positive locking mechanisms, pins, clips, latches, snap-fit mechanisms, hook-and-loop, ties, and/or any other suitable mechanical fasteners. The mounting mechanism can additionally or alternately mount battery cells, modules, and/or packs with bonding agents, glue, cement, paste, epoxy, spray adhesives, thermosets, resins, tape, and/or any other suitable adhesives.

Battery packs 102 and/or battery modules 104 can be assembled into the wing/nacelle in any suitable manner as discussed in more detail below. Battery packs 102 and/or battery modules 104 are preferably inserted from below through an access hole, but can be inserted from any suitable direction (inboard side, outboard side, top, front, rear, etc.). Battery packs 102 or battery modules 104 can be raised vertically (e.g., from below), but additionally or alternately can be inserted at an angle and/or rotated into position. Angled insertion and rotating the battery pack 102 or battery module 104 into position can enable insertion even if a dimension thereof exceeds a dimension of the access hole. In a specific example, a chordwise dimension of the battery pack 102 or battery module 104 can exceed a chordwise dimension of the access hole. In a second specific example, the chordwise dimension of the battery pack 102 or battery module 104 can be inserted at an angle aligned with a diagonal or space diagonal of the wing interior (whose length exceeds the chordwise dimension of the battery pack 102 or battery module 104), and then the battery pack 102 or battery module 104 can be rotated into place such that a base-plane and/or chord of the battery pack 102 or battery module 104 is substantially aligned with a wing chord. However, the battery pack 102 or battery module 104 can be inserted by: a jack (e.g., hydraulic, pneumatic, electric, manual), crane, user (e.g., with/without assistive devices, etc.), and/or any other suitable device/process.

However, the system can include any other suitable batteries and/or battery systems that can be otherwise suitably configured.

The system 100 can optionally include a cooling system (e.g. fluid circulation system 114) that functions to circulate a working fluid within the battery pack 102 and/or battery module 104 to remove heat generated by the battery pack 102 and/or battery module 104 during operation or charging. The cooling system can optionally function to mitigate and/or reduce the likelihood of battery thermal events. The cooling system can include one or more: fluid envelope, pumps, working fluids, reservoirs, hoses, pipes, fluid couplings, valves, heat exchangers, refrigeration components, fans, ducts, pressure vents, caps, freeze plugs, fluid monitoring equipment (flow sensors, temperature probes, etc.), fasters, fluid seals, and/or any other appropriate cooling components. Cooling system components can be housed and/or packaged with a battery pack, separately from batteries, within cavities, within the wing, within the nacelle, and/or in any other appropriate location. In a specific example, the battery pack/module can be connected to the fluid circulation system described in U.S. application Ser. No. 16/857,003, filed 23 Apr. 2020, which is incorporated in its entirety by this reference.

Battery cells 106, battery module 104 and/or battery packs 102 can be fluidly connected by the cooling system in series and/or parallel in any suitable manner. Modules can be connected by a set of inter-module connections, which can run directly between two modules, connect via bulkhead connections (e.g., to ribs and/or spars), can be individually connected to a common fluid connector (e.g., blind connector), and/or can be otherwise suitably connected. Intramodule (or intra-pack) connections can be inside of heat sinks, built into the module architecture (e.g., via a fluid manifold), and/or otherwise connected. On or more portions of the cooling system and/or components of the cooling system can be integrated into the construction of battery packs/modules, mounted to battery packs/modules, and/or inserted with battery packs/modules.

However, the system can include any other suitable cooling system (e.g. fluid circulation system 114), which can be otherwise suitably implemented.

Figure 2:
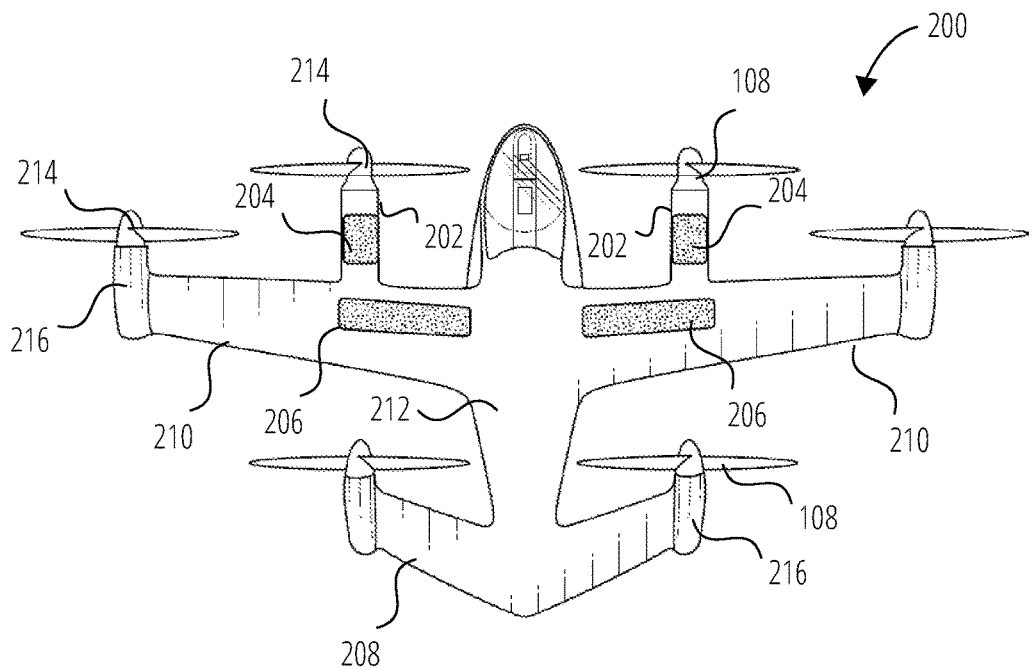
FIG. 2 is a plan view of one example of the system of FIG. 1, in which the system comprises a rotorcraft.

FIG. 2 is a plan view of one example of the system 100 of FIG. 1, in which the system 100 comprises a rotorcraft 200. The rotorcraft 200 includes a fuselage 212, two wings 210, an empennage 208 and propulsion systems 108 embodied as tiltable rotor assemblies 214 located in nacelles 216. In the example shown in FIG. 2, the battery packs 102 comprise nacelle battery packs 204 and wing battery packs 206. In the illustrated example, the nacelle battery packs 204 are located in inboard nacelles 202, but of course it will be appreciated that the nacelle battery packs 204 could be located in other nacelles 216 forming part of the rotorcraft 200. The rotorcraft 200 will typically include associated equipment such as an electronic infrastructure, control surfaces, a cooling system, landing gear and so forth. The rotorcraft 200 is configured to enable wing or nacelle-mounted battery installation and operation.

Figure 4A:
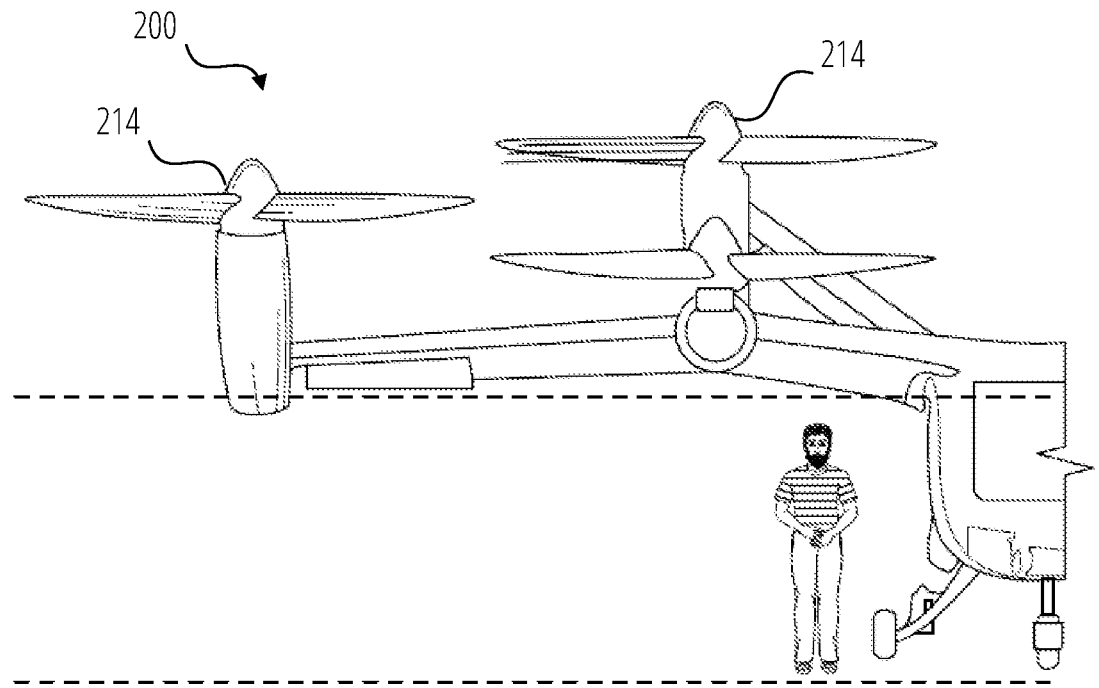
FIG. 4A and FIG. 4B are front view and side view representations of the rotorcraft of FIG. 2.
Figure 4B:
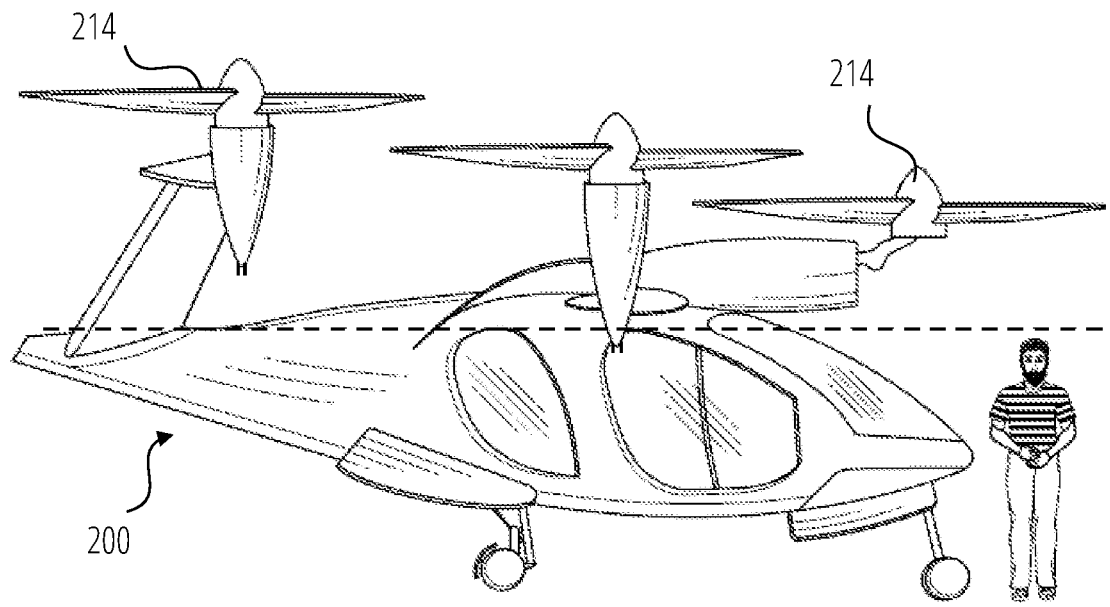

The wings 210 function to generate lift to support the airborne aircraft during forward flight. The wings 210 can additionally or alternately function to structurally support the battery packs 102, battery module 104 and/or propulsion systems 108 under the influence of various structural stresses (e.g., aerodynamic forces, gravitational forces, propulsive forces, external point loads, distributed loads, and/or body forces, etc.). The wings 210 can have any suitable geometry and/or arrangement on the aircraft. As shown in FIG. 4A and FIG. 4B, preferably, the wings 210 are arranged above the passenger entry location (e.g., door), but can be arranged rearward of the passenger entry location, above a head clearance height in a ground configuration of the rotorcraft 200, and/or in any other suitable position. The wings 210 can be anhedral, dihedral, straight, tapered toward a tip, gull wing, inverted gull wing, high-wing, mid-wing, low-wing, twisted, and/or have any other suitable geometry.

The wings 210 can include spars that function as the primary spanwise structural members of the wing. The spars can additionally or alternately function to connect the wing to the fuselage and/or function to support all or a portion of the weight of the wings 210, propulsion systems 108, and/or battery packs 102 when the aircraft is on the ground. The wing can include any suitable number of spars. The wing can include 0, 1, 2, more than 2, and/or any other suitable number of spars. The spars can be arranged in any suitable manner within the wings 210. Preferably, the spars extend in a spanwise or lateral direction, and can extend across a full width of the aircraft, a partial width of the aircraft, terminate at the fuselage 212, extend through the fuselage 212, and/or be otherwise suitably configured. Preferably, the wings 210 includes spars on opposing ends of wing battery packs 206, but spars can be arranged: forward of the wing battery pack 206, rearward of the wing battery pack 206, above the wing battery pack 206, proximate a leading edge of a wing 210, proximate a trailing edge of the wing 210, and/or in any other suitable configuration. However, spars can include any other suitable features and/or be otherwise suitably implemented.

The wings 210 can include ribs that function to support portions of the wing skin and/or define the cross-sectional shape of the wing skin. The ribs can additionally or alternately function to mount one or more battery packs/modules (or a portion of battery pack/module components) within the wing 210. The ribs are preferably mounted to the spars, and can be solid, hollow, pocketed, truss-shaped, and/or have any other suitable structure. The ribs can define any suitable cross-sectional geometry, and preferably define airfoil cross sections that, when interpolated, can form the wing exterior geometry. The ribs can define an inboard airfoil cross section (e.g., inboard of the wing battery pack 206) and an outboard airfoil cross section (e.g., outboard of the wing battery pack 206), however, the ribs can be otherwise configured to support a stressed skin wing (e.g., at an inboard and outboard portion) without defining the shape. The ribs can include any suitable material construction such as: metal (e.g., aluminum, titanium, steel), composite (e.g., carbon fiber, fiberglass, etc.), plastic, and/or any other appropriate material(s). The ribs can be bonded, fastened, welded, and/or otherwise suitably connected to the spars. However, ribs can include any other suitable features and/or be otherwise suitably implemented.

The wing 210 and/or ribs can include any suitable set of airfoil cross sections. Each cross section preferably defines a chord-line extending from a leading edge to a trailing edge of the airfoil. The inboard and outboard airfoil cross sections airfoil cross sections can cooperatively define: a twist angle, a dihedral (or anhedral) angle, taper, forward (or rearward) sweep angle, and/or any other appropriate geometric characteristics of the wing 210. The twist angle is preferably the difference in the angle of attack of the chord angle of the inboard airfoil cross section and the outboard airfoil cross sections, and can be positive, negative, 0, and/or any other appropriate twist angle. The twist angle (e.g., absolute value, positive, negative) can be between 0 and 15 degrees, any suitable range therein, and/or any other suitable angle. The dihedral (or anhedral) angle is preferably defined by the angle, relative to the ground, of the line extending between the center-points (e.g., geometric, CoL) of the airfoil cross sections, projected into a frontal plane (or lateral/vertical plane). The dihedral (or anhedral) angle can be 0-30 deg, any suitable range therein, and/or any other appropriate anhedral/dihedral angle. The airfoil cross-sections can define any suitable taper in a spanwise direction, which is preferably defined in terms of a change in chord length and/or other cross sectional parameters (shape, area, thickness, chord length, etc.). The wing 210 is preferably a straight wing (rib cross sectional area does not vary), but can have a change in chord length and/or cross sectional area between the inboard and outboard airfoil cross sections of 5%, 10%, 20%, 30%, 50%, any range bounded by the aforementioned values, and/or any other suitable taper. The cross-sectional shape of the wing 210 can define any suitable thickness, which can have any suitable relationship to the chord length. The thickness of the wing 210 can be above a threshold percentage of the chord length, below a threshold percentage of the chord length, greater than the thickness of the battery, and/or have any other suitable thickness, such as <5%, 5%, 10%, 12%, 15%, 20%, 21.5%, 23%, 25%, 30%, 35%, 50%, >50%, any range bounded by the aforementioned values, and/or any other suitable thickness relative to the chord length. The wing thickness can be defined, for each spanwise point, as: the maximum thickness, the minimal thickness of the airfoil cross-section that is between wing spars, the minimal thickness for chordwise positions of a retained mass (e.g., battery pack) within the airfoil, and/or can be otherwise suitably defined.

The wings 210 (and/or components thereof, such as the nacelles 216) can include a skin that functions to provide all or a portion of the exterior aerodynamic profile of the wing. The skin can additionally or alternately function to carry a portion of flight and/or ground loads of the aircraft (e.g., stressed skin wing), and/or define the wing shape. The skin can additionally function to mount one or more battery packs 102 or battery modules 104 to the wing 210. The skin preferably includes an upper surface opposing a lower surface, with the upper and lower surfaces intersecting along a leading edge and a trailing edge of the wing. The skin geometry is preferably smooth and interpolated across the airfoil cross sections of the wing. Preferably, the lower surface of the skin is relatively flat along an inboard portion of the wing 210 and/or across a span of the wing battery pack 206, however the lower surface can be concave, convex, or have any suitable geometry. Specifically, for cross sectional chord length (L), the lower surface of the skin preferably deviates from the chord line (for each cross section) by less than a threshold distance, which can be: 0.02 L, 0.05 L, 0.07 L, 0.1 L, 0.15 L, 0.2 L, 0.25 L, and/or any other suitable threshold. The lower skin surface can induce (or be assumed to induce) turbulent flow, promote laminar flow, and/or induce other flow patterns during wing operation, which can assist with wing geometry optimization. At the root (inboard section) of the wing 210, the relatively flat geometry can be proximal to a door, provide clearance for a door in an open configuration, provide headroom for uses standing adjacent to a door (outboard relative to the door), provide clearance for a user standing below the wing (e.g., 6' ground clearance, 6'6" ground clearance, 7' ground clearance, 8' ground clearance, etc.) in a ground configuration, and/or otherwise suitably improve user access to the aircraft.

The skin can include any suitable material construction such as: metal (e.g., aluminum, titanium, steel), composite (e.g., carbon fiber, fiberglass, etc.), plastic, and/or any other appropriate material(s). The skin can be bonded, fastened, welded, and/or otherwise suitably connected to the spars and/or ribs.

However, skin can include any other suitable features and/or be otherwise suitably implemented.

Figure 3:
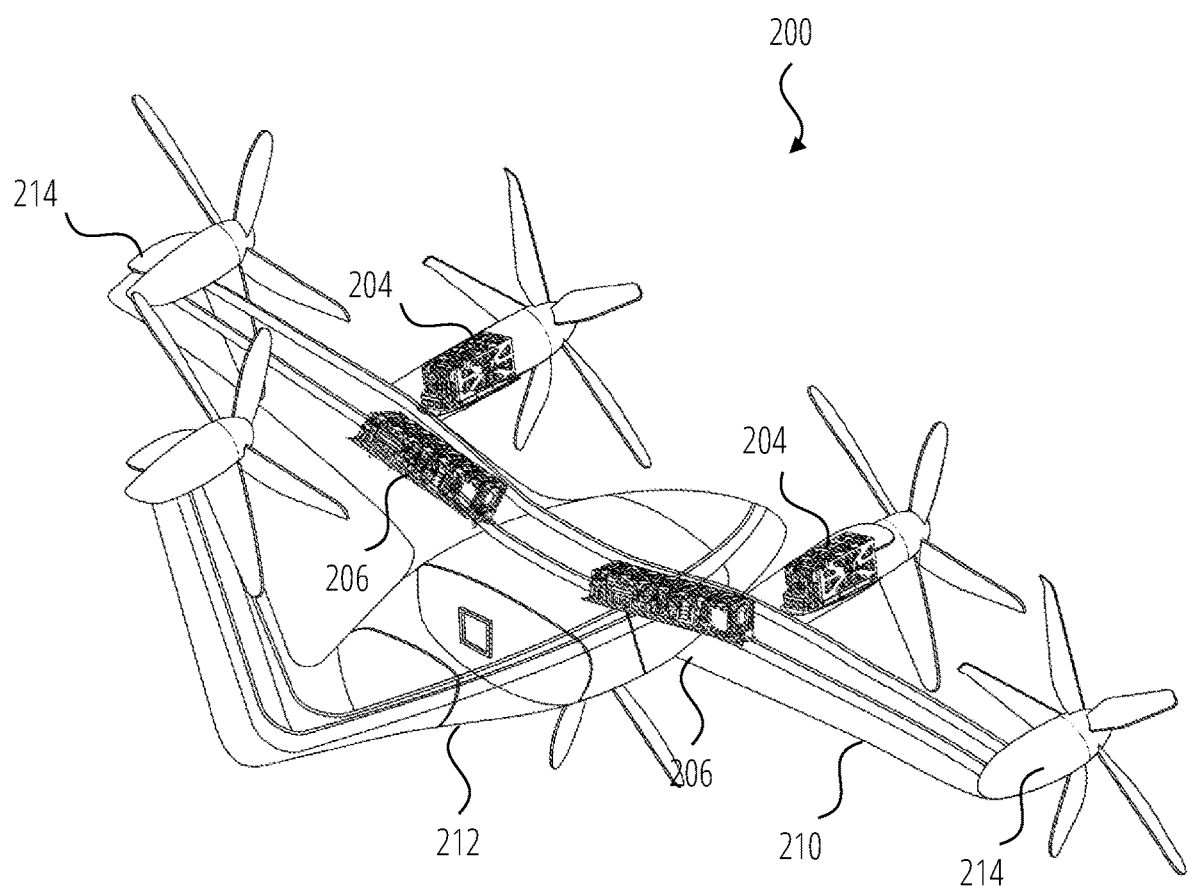
FIG. 3 is a rear perspective view of the rotorcraft of FIG. 2.

FIG. 3 is a translucent perspective view of the rotorcraft 200 of FIG. 2. FIG. 3 illustrates the positioning of the wing battery packs 206 in the wings 210 as well as the positioning of the nacelle battery packs 204 in the inboard nacelles 202.

FIG. 4A and FIG. 4B are front view and side view representations of the rotorcraft 200 of FIG. 2, illustrating the positioning of the propulsion systems rotor assemblies 214 above passenger head height when the rotorcraft 200 is parked.

Figure 5:
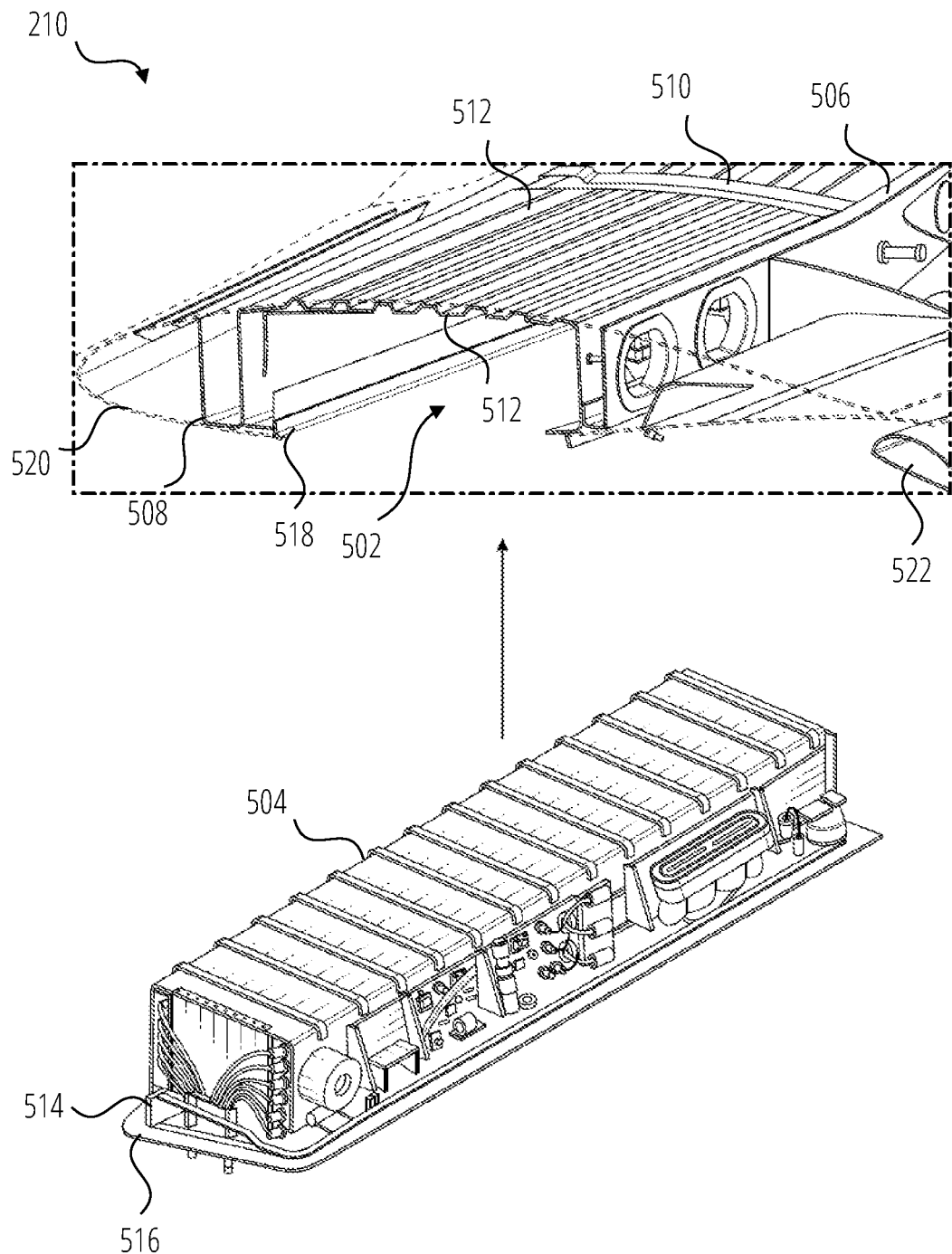
FIG. 5 is a cross-sectional representation of a wing of the rotorcraft of FIG. 2 according to one example.
Figure 6:
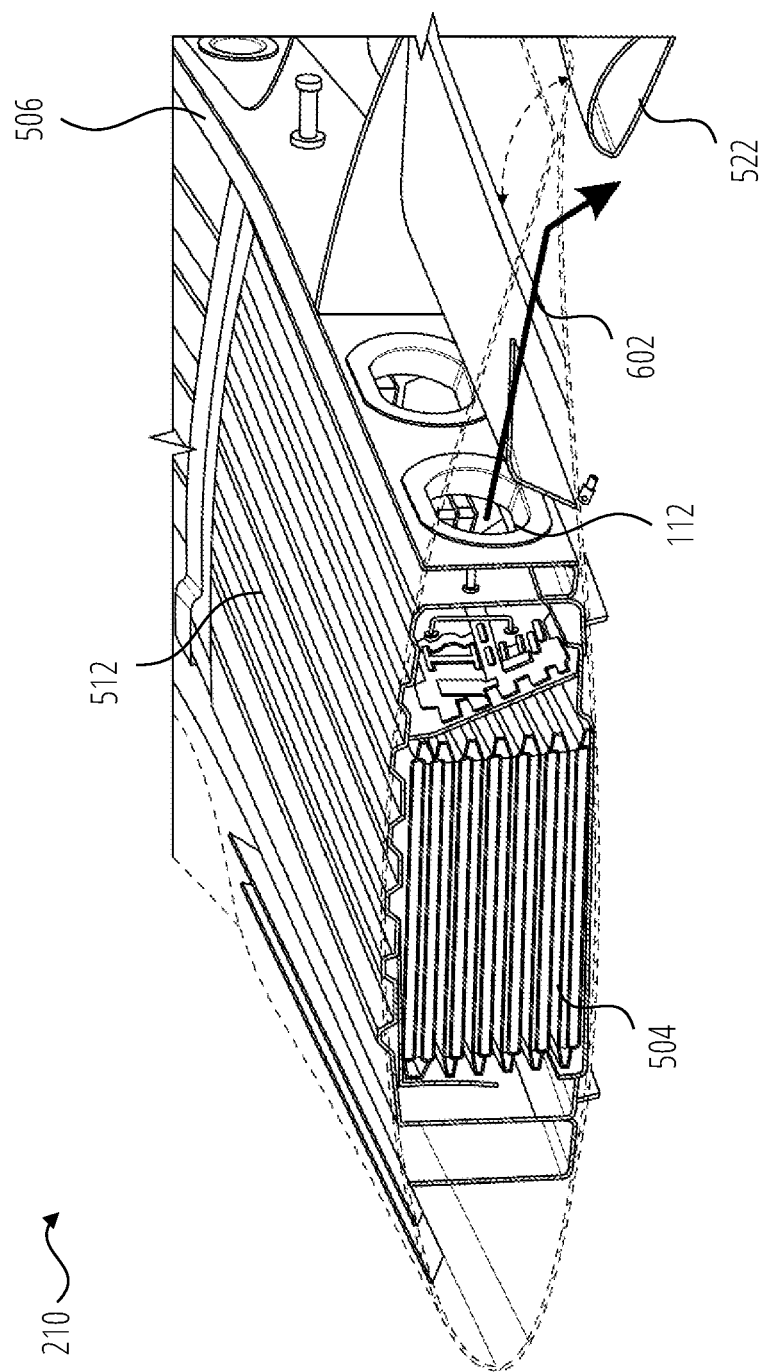
FIG. 6 is a cross-sectional representation of a wing of the rotorcraft of FIG. 2 according to one example.

FIG. 5 and FIG. 6 show cross-sectional representations of a wing 210 of the rotorcraft 200 of FIG. 2, in accordance with one example. As illustrated the wing 210 can include a cavity 502 that functions to house and/or retain a retained mass, such as battery pack 504 in one example. The cavity 502 is preferably optimized to maximize an available internal volume in the wing (and/or nacelle), while still enabling efficient wing operation (e.g., efficient lift generation, without exceeding a threshold coefficient of drag in forward flight, without exceeding a threshold CL/CD value, etc.).

The cavity 502 can be located in any suitable portion of the wing 210. The cavity 502 can be: located on an inboard portion of the wing 210, between an inboard rib (not shown) and an outboard rib 510, between a forward spar 508 and a rearward spar 506, inboard of a nacelle 216, outboard of a nacelle 216, inside a nacelle 216, and/or be otherwise suitably located within the wing 210. The cavity 502 has dimensions that are at least as large as the battery pack 504 (e.g., with a nominal clearance, with no clearance), but can alternately house the battery pack with an interference fit, and/or otherwise suitably house the battery pack 504.

In this example, a mounting mechanism or structure, described in more detail below, can connect a monolithic battery structure (e.g. battery pack 504) to the wing airframe (e.g., ribs, spars, and/or skin). The monolithic battery structure can form a portion of the wing skin extending across an access hole. The monolithic battery structure can be completed before mounting/installation, or can be completed upon installation. In a specific example, the monolithic battery structure is electrically complete upon installation/mounting and defines a nominal pack voltage of operation. This nominal pack voltage can be an operating voltage of one or more electrical systems of the aircraft, and the monolithic battery structure can be connected in series and/or parallel as an element of the aircraft energy system.

The battery cells 106 and/or battery modules 104 can cooperatively define any suitable cross sectional geometries. Preferably, the cross sectional geometry of the battery cells 106 and/or battery modules 104 is rectangular, but can alternately be trapezoidal, include chamfered corners (e.g., on upper corners), and/or include any other appropriate geometry. Alternately, the battery cells 106 and/or battery modules 104 can define a circumscribed rectangular cross section. The battery cells 106 and/or battery modules 104 cross sections can cooperatively define a lower battery base plane defining a width and length of the battery pack 102. Preferably, the cross sections of the battery cells 106 and/or battery modules 104 are invariant (or substantially invariant) in a spanwise direction of the wing, but can alternately be variable, include distinct segments (e.g., each invariant), and/or be otherwise suitably implemented. The cross-sectional geometry of the battery cells 106 and/or battery modules 104 can be the same for a battery pack 504 mounted within an inboard portion of the wing as for a battery mounted within a nacelle, or can be different The rotorcraft 200 can include a cover 512 that functions to separate the battery cells 106 within the cavity 502 from a remainder of the wing interior. Covers 512 can additionally or alternately function to increase the structural rigidity of the wing in torsion and/or bending, and/or function as a closeout. The cover 512, alone or in conjunction with other closeouts, can provide ingress protection to the battery (e.g., IP65, IP66, IP67, etc.), fluidly isolate the battery, and/or provide a fire-resistant barrier between the battery and other structural elements of the wing (e.g., spars, ribs, skin, etc.). The cover 512 and/or other closeouts can prevent ingress of dust, solid objects, water droplets, water jets, human fingers, and/or any other undesirable objects. The cover 512 can be mounted to the ribs, upper surface of the skin, spars, the battery pack, baseplate, and/or other suitable components/ endpoints. The cover 512 can optionally include a pinned or rigid connection to the battery pack 504 (e.g., top of the battery pack, side of battery opposing the baseplate) and/or battery cells 106, which can increase the resilience of the energy system to vibrational modes. However, the cover can include any other suitable features and/or be otherwise suitably implemented.

The rotorcraft 200 can optionally include a baseplate adaptor 514 that functions to couple the base plane of the retained mass (e.g. the battery pack 504) to a baseplate 516. The baseplate adaptor 514 can additionally or alternately structurally support the mass retained by the baseplate. Twisting, tapering, or other cross sectional variations of the wing skin across the span of the battery pack 504 can result in a gap (or offset) between a base plane of the battery pack 504 and the baseplate 516 or the wing skin. The baseplate adaptor 514 can partially or fully occupy or account for this offset. The baseplate adaptor 514 can be fastened to the baseplate 516 and the battery pack 504 in any suitable manner.

The baseplate adaptor 514 can preferably be attached by an adhesive, bonding agent, or mechanical fastener, but can alternately be formed as a part of the baseplate and/or separately connected to the battery cells, battery modules, ribs, spars, and/or skin of the aircraft. The baseplate adaptor can include any suitable geometry. The baseplate adaptor 514 can span a full breadth (spanwise and/or chordwise direction) of the baseplate 516 and/or the battery pack 504, or can span only a portion of the baseplate 516 and/or the battery pack 504 breadth.

The baseplate adaptor 514 can be a singular component (e.g., per battery pack, per battery module 104) or can include a plurality of distributed components (e.g., analogous to rib supports). The baseplate adaptor 514 can be rigid, semi-compliant, or compliant. Baseplate adaptor 514 rigidity can improve load transmission, vibration characteristics (e.g., damping), mounting tolerances, and/or provide increased structural integrity. However, the baseplate adaptor 514 can include any other suitable features and/or be otherwise suitably implemented. The mass retained within the wing by the baseplate 516 and/or baseplate adaptor 514 can include: battery mass, fluid (e.g., liquid hydrogen) mass, fuel mass, fuel cell mass, fluid circulation system mass, cooling component mass, and/or any other suitable mass.

The battery pack 102/504 functions to store electrochemical energy in a rechargeable manner. The battery pack 102, which is preferably at least partly isolated from loads experienced by the rotorcraft 200, can additionally or alternately function to increase the structural rigidity of the wing 210 in torsion and/or bending. The system can include any suitable number of battery packs 102, such as 0, 1, 2, 3, 4, more than 4, and/or any other suitable number of battery packs 102 as a part of a complete energy system. Battery packs 102 can be arranged and/or distributed about the aircraft in any suitable manner. Preferably, battery packs are evenly distributed about the aircraft CoG and/or CoL, such as with an even number on the left/right sides and/or forward/rearward sides of the aircraft CoG or CoL, but can be unevenly distributed and/or otherwise arranged. Preferably, battery packs 102 are arranged proximal to a vertical lateral plane of the aircraft, but can be otherwise suitably arranged. Battery packs 102 can be arranged within wings (e.g., inside of a cavity), inside nacelles, and/or in any other suitable location on the aircraft. In a specific example, the system includes a first battery pack 504 within an inboard portion of a left wing and a second battery pack 504 within an inboard portion of a right wing. In a second specific example, the system includes a first nacelle battery pack 204 within an inboard nacelle 202 of a left wing 210 and a second nacelle battery pack 204 within an inboard nacelle 202 of a right wing 210. In a third example, one or more battery packs include a plurality of battery modules.

The battery packs 102 can individually or cooperatively have any suitable weight relative to the aircraft (loaded and/or unloaded). The battery weight can be less than 10%, 10%, 20%, 30%, 40%, 50%, any range bounded by the aforementioned values, and/or any other suitable weight relative to the aircraft. The battery pack weight can be: less than 5 lbs, 5 lbs, 50 lbs, 100 lbs, 250 lbs, 300 lbs, 350 lbs, 400 lbs, 500 lbs, 1250 lbs, 1500 lbs, greater than 1500 lbs, any range bounded by the aforementioned values, and/or any other suitable weight.

The battery packs 102 can include or exclude a battery pack housing/enclosures (e.g., closeouts), can be assembled into the aircraft separately from the battery pack housing/ enclosures, and/or can be otherwise suitably configured.

The wing can include an access hole 518 (see further FIG. 22C), which functions to enable insertion of the battery pack 504 into the wing 210 therethrough. The access hole 518 can be proximal to the cavity 502, define a boundary of the cavity 502, be continuous with the cavity 502, fluidly connect the cavity (e.g., bottom, top, side, portion thereof, interior) with the exterior of the wing 210, and/or have any other suitable relationship to the cavity 502. The access hole 518 is preferably defined by the wing skin 520, but can alternately be defined by an associated closeout and/or any other suitable reference. The access hole 518 can be located on any suitable portion of the wing 210—it can be arranged on an inboard portion, root portion, outboard portion, upper surface, lower surface, nacelle inner side, nacelle top, nacelle outer side, nacelle bottom, aligned with the cavity (e.g., projection onto the wing skin), offset from the cavity, and/or any other suitable location.

In variants, the access hole 518 is arranged on the high-pressure side of the wing (e.g., lower surface) since it can be advantageous to place aerodynamic disturbances on high pressure side of wing 210 so that low pressure (higher velocity) flow is as uninterrupted as possible—which can minimize efficiency impacts and/or CL impacts of surface features (when compared to the effect of the same surface features incident on the low pressure side). The wing skin 520 and/or aerodynamic profile of the wing 210 can be aerodynamically optimized for prescribed initiation of laminar to turbulent boundary layer flow at an access hole portion of the lower surface (e.g., leading edge of the access hole 518, trailing edge of the access hole 518, across a width of the access hole 518, etc.). Alternately, the wing can be optimized for laminar to turbulent transition of boundary layer across an opposite surface of the wing relative to the access hole 518, or another portion of the same surface of the wing 210 relative to the access hole during a portion/all modes of flight and/or attack angles. Alternately, there can be no prescribed boundary layer characteristics, and/or the wing 210 can be otherwise implemented.

The access hole 518 can define any suitable geometric parameters. A (chordwise) length can be defined for the access hole relative to a chord length (L) of the wing 210. The length is preferably between 0.3 L and 0.8 L, but can be any suitable length in absolute or relative terms. A (spanwise) breadth can be defined for the access hole 518 relative to any suitable components. The breadth can be substantially the distance between an inboard and an outboard rib. In a first variation, the access hole breadth extends between two ribs, with no intervening ribs. In a second variation, the access hole breadth spans one or more ribs. In a specific example, the battery pack 102 includes a number (N) modules, and the number of intervening ribs on the access hole breadth is related to the number of modules: there can be N−1 ribs, N+1 ribs, and/or any other suitable number of ribs spanned by the access hole 518. The access hole breadth can extend from an inboard portion of the wing 210 up to a spanwise location of a nacelle, terminate before a nacelle, extend across a portion of a nacelle, extend across a portion of the wing 210 outboard of a nacelle, and/or be otherwise suitably configured.

In a specific example, an access hole 518 can be located on the lower surface of the wing. In a second specific example, an access hole can be located on a nacelle (e.g., lower surface, upper surface, outboard surface, inboard surface, etc.), and/or configured to minimize a drag profile of the nacelle. However, the access hole 518 can include any other suitable features and/or be otherwise suitably implemented.

The wing 210 can include a closeout that functions to enclose and/or protect a battery pack and/or battery module from surroundings. Closeouts can cover, mount to, and/or be otherwise associated with access holes 518, but can alternately be internal inside the wing. Closeouts can mount directly to the battery pack 504, directly to the wing 210, be manufactured as a part of the wing 210, and/or be otherwise mounted/assembled into place. Closeouts can be attached: prior to battery pack 102 or battery module 104 insertion, synchronously or as a part of battery insertion, independently of the batteries, and/or be otherwise suitably attached. Closeouts can be manufactured from any suitable materials.

Preferably, closeouts include the same material composition as the wing skin, but can alternately include a different material composition from the wing skin. Materials can include: fire-resistant materials, metals (e.g., aluminum, steel) and/or other materials, with any suitable coatings, finishes, heat treatments, and/or other suitable materials. The material can include: carbon fiber, titanium, aluminum, fiberglass, and/or any other suitable metal, composite, or other material. The closeout can be mechanically connected to the wing (and/or nacelle) by mechanical fasteners, adhesives/bonding agents, and/or otherwise suitably connected. Mechanical fasteners can be inserted and/or applied from below the wing and/or normal to the wing skin, with fastener heads flush with the wing skin—which can minimize the aerodynamic influence of external fasteners. Closeouts can include any suitable seals (e.g., fluid seals) in conjunction with attachment mechanisms. Closeouts can include any suitable mechanical tolerances, clearances, and/or other features to simplify manufacturing and/or assembly.

Closeouts can include a baseplate 516 that functions to enclose, cover, and/or shroud an access hole. The baseplate 516 can additionally or alternately function to structurally support a portion of the wing 210 and/or stiffen the wing 210 (e.g., in torsion). By closing the access hole 518 in the wing skin 520, the baseplate can distribute torsional (and bending) loads across the wing skin 520, reducing the stress concentrations that would otherwise arise from the access hole. In a specific example, airfoil torsion and/or other loads are transmitted along the wing skin 520 and through the closeout. In this example, more than a threshold proportion of the airfoil loads (e.g., generated during forward and/or vertical flight) are routed around the cavity 502 interior (e.g., 100%, 90%, 80%, etc.). Additionally, the baseplate 516 can match or approximate the missing airfoil geometry of the wing skin 520 (interpolated between ribs, etc.), thereby minimizing the aerodynamic influence of the access hole 518. In a first variant, battery cells 106, battery module 104 or a battery pack 102 can be mounted to the baseplate 516 prior to battery insertion. In a second variant, battery cells 106, battery module 104 or a battery pack 102 can be mounted to the wing independently of the baseplate. In the first and second variants, the baseplate 516 can avoid structural loads from being transferred to the cells 106 (stressing the cells 106), which could result in cell life degradation and/or failure. A baseplate 516 can closeout an access hole 518 in the wing skin 520 on any suitable portion and/or component of the wing including: an inboard portion of the wing, a nacelle, and/or any other suitable component/location. However, the baseplate 516 can include any other suitable features and/or be otherwise suitably implemented.

Also as shown in FIG. 6, a spar (such as rearward spar 506) may be provided with a burst membrane 112 forming part of a vent pathway 602 as part of a venting systems. Venting systems are discussed in more detail below.

The rotorcraft 200 can optionally include control surfaces 522, which function to improve control authority in one or more modes of flight by changing the aerodynamic profile of the aircraft. Control surfaces can optionally function to provide vent pathways 602 out of the wing interior, forming an end of a vent and/or selectively opening and closing a vent relative to the aircraft exterior. Control surfaces can include: flaps, air brakes, ailerons, slats, elevators, spoilers, rudders, ruddervators, and/or any other suitable control surfaces. In variants, the control surfaces can be redundantly powered and/or controlled. In a specific example, the control surfaces are redundantly powered by the battery architecture as described in U.S. application Ser. No. 16/428,794, filed May 31, 2019, which is incorporated in its entirety by this reference. However, the system 100 can include any other suitable control surfaces that can be otherwise suitably configured.

Figure 7:
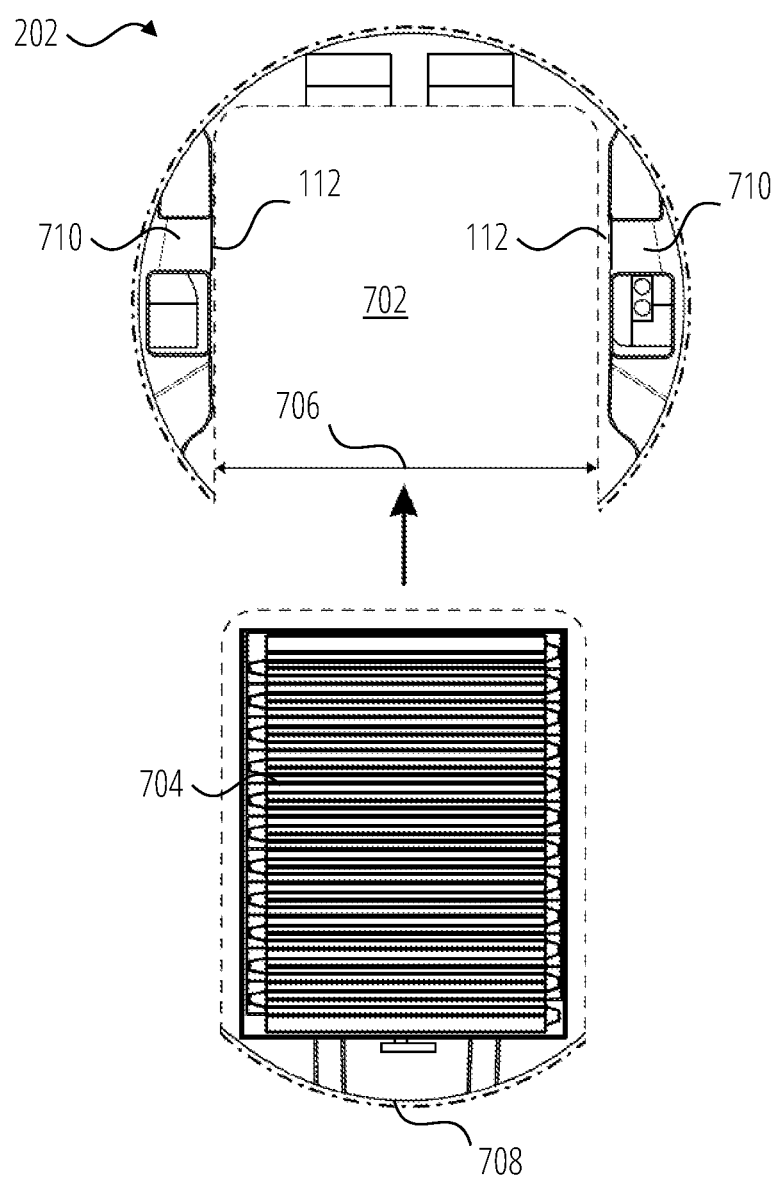
FIG. 7 is a cross-sectional representation of a nacelle of the rotorcraft of FIG. 2, according to one example.
Figure 8:
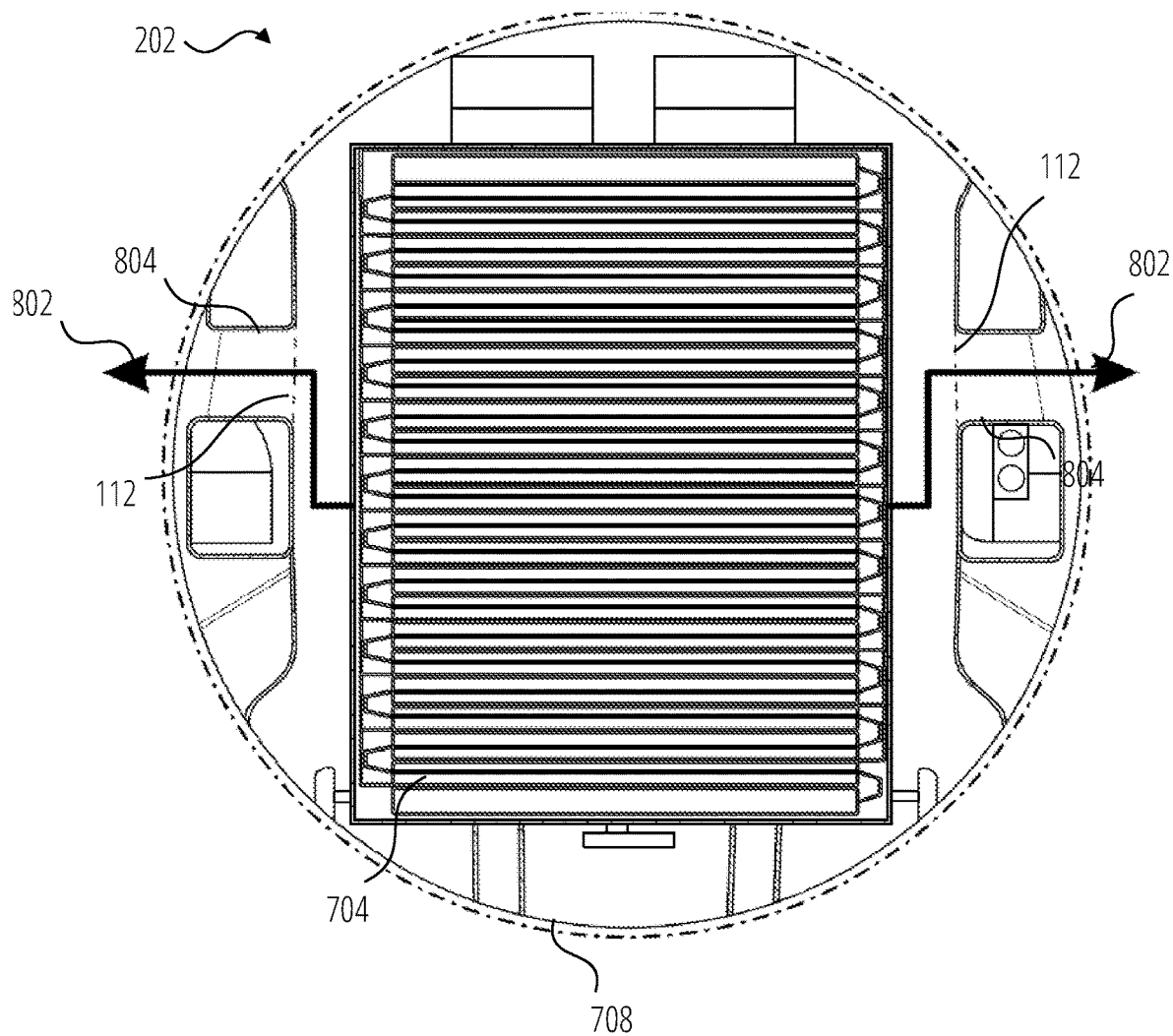
FIG. 8 is a cross-sectional representation of a nacelle of the rotorcraft of FIG. 2, according to one example.

FIG. 7 and FIG. 8 show cross-sectional representations of an inboard nacelle 202 of the rotorcraft 200 of FIG. 2, in accordance with one example. As can be seen from FIG. 7 a cavity 702 is provided in the inboard nacelle 202 into which a battery pack 704 can be inserted via an access hole 706, which is closed by cover 708 that completes the outer surface of the inboard nacelle 202. The inboard nacelle 202 also includes vents 710 and burst membranes 112, which are discussed in more detail below.

The system 100, of which rotorcraft 200 is an example, can optionally include a venting system that functions selectively to fluidly connect one or more battery modules 104 or battery packs 102 to the aircraft surroundings (e.g., the ambient environment). The venting system additionally or alternately functions to divert any discharge away from primary aircraft structures during a thermal event involving a battery pack 102 or battery module 104.

As illustrated in FIG. 8, the venting system can include one or more vents 804 that fluidly connect one or more battery cells in a battery pack 704 with the ambient environment. Each vent 804 can include one or more burst membranes 112 and define one or more vent pathways 802.

The vent 804 and/or vent pathway 802 may fluidly and/or mechanically connect to one or more batteries (e.g., battery interior, battery cell vent, pack, module, etc.). The vent 804 can include thermal insulation and/or fire-resistant materials, or may not include thermal insulation. The vents 804 can be formed with portions of existing fire-enclosures, airframe components (wing skin, ribs, spars, etc.), control surfaces, and/or other suitable components.

While the vents illustrated herein are typically shown to have a single inlet and outlet, the vents may also be formed as manifold vents, with multiple inlets (e.g. from more than one battery module or battery pack) or with multiple outlets, or some combination thereof.

The burst membranes 112 function to selectively connect one or more battery cells to an aircraft exterior in response to a thermal event. A burst membrane 112 can include: a rupture disk, pressure safety disc, burst disc, burst diaphragm, pressure relief valve, and/or any other suitable component. Each burst membrane 112 can be associated with one or more of: a battery pack, a battery module, a spar, a rib (e.g., spanned by the battery pack), a closeout, a wing, a vent path, a vent, the nacelle side (inboard/outboard), the fuselage side, and/or any other suitable unit. Similarly, each unit (such as a: battery pack, battery module, spar, rib, closeout, wing, vent path, vent, nacelle side, etc.) can be associated with one or more burst membranes 112. Burst membranes 112 can be arranged at one or more locations within a vent pathway 802 and/or vent 804, such as: proximal to battery cells, proximal to the ambient environment, at an aircraft exterior (e.g., forming part of wing skin and/or wing exterior), and/or in any other suitable location.

The burst membranes 112 can include any suitable geometry. A burst membrane 112 can be a disc, oval, panel (e.g., rectangular), and/or have any other suitable geometry, which encloses/covers any suitable area. The burst membrane 112 can be single directional or bi-directional, multi-use or single use (e.g., bursts and needs to be replaced), single membrane or multi-membrane (e.g., forward-acting and reverse buckling), and/or any other suitable membrane. The burst membrane 112 can be constructed of and/or include any suitable materials, such as carbon steel, Hastelloy, stainless steel, graphite, polymers, low-temperature materials (e.g., will deform and/or fail at temperatures above a burst temperature/pressure), high temperature materials (e.g., will not deform and/or fail at temperatures/pressures), and/or any other appropriate materials.

The burst membranes 112 can engage and/or release under any suitable pressure and/or temperature conditions. In a specific example, the burst membranes 112 are configured to vent in excess of a pressure threshold (e.g., burst pressure) and/or temperature threshold, wherein the burst pressure is selected to activate in response to a thermal event, but not under normal aircraft operating conditions.

The venting system is preferably operable between a sealed mode and a venting mode. In the sealed mode, the burst membrane 112 and/or vent 804 fluidly separates a first region from a second region (i.e., enabling a pressure differential therebetween). The sealed mode can prevent particulates and/or gasses from propagating from the second region to the first region and vice versa. Alternately, the first and second regions can be fluidly connected by a circuitous fluid pathway (e.g., adjacent to fire sensitive structural components, passing through a particulate and/or gas filter, etc.). In a venting mode, the venting system fluidly connects the first fluid region to the second fluid region (e.g., by a direct fluid path). In a specific example, the first region includes a battery cell 106 (e.g., inside the battery pack 704) and the second region includes an aircraft exterior. In a second example, the first region is an interior of a battery pack 102 and the second region is an exterior of the battery pack 102. In a third example, the first region is a wing interior forward of a spar and the second region is a wing interior rearward of a spar. However, the venting system and/or vent can include any other suitable burst membranes.

The vent and/or burst membrane can define one or more vent pathways with any suitable directionality. Vent pathways (e.g. vent pathway 602 or vent pathway 802) can be directed: away from the fuselage (outboard) to the sides (e.g., of a nacelle), rearward, upward, downward, into a region of an airfoil (or wing skin) configured to promote turbulent flow, into a region of an airfoil (or wing skin) configured to promote laminar flow, out of a wing (single-directional or bi-directional), and/or have any other suitable directionality.

Battery venting pathways can be provided in an airfoil section of the wing 210 and/or nacelles (e.g. inboard nacelles 202) with any suitable arrangement. Venting pathways can extend through, between, away from, and/or around: spars, ribs, the wing skin, control surfaces, ribs, fire-resistant barriers, closeouts, and/or any other suitable components. In a first variant, battery modules and/or cells can share a common vent pathway extending through a spar and/or control surface (e.g., wing flap). In a second variant, battery modules and/or cells can include individual vent paths.

Vent pathways can be provided with any suitable relationship to the nacelles, e.g. inboard nacelles 202. Vent pathways can extend through a nacelle side, top, bottom, and/or rear, can converge with a vent path in an airfoil section of the wing, and/or can be otherwise suitably implemented. The termination of vent pathways at the aircraft exterior can be inset within a persistent external cavity (e.g., aerodynamically optimized) which can be selectively sealed, can form a portion of the exterior wing skin, and/or can be otherwise suitably configured.

The venting system can optionally include a safety relief valve (e.g., pressure relief valve) that can be in series (e.g., before or after) or in parallel with one or more burst membranes 112. Safety relief valves can be mounted and/or installed with the battery pack 102 or a battery module 104, but can alternately be a separate installation. In variants, the safety relief valve can be an LRU, which can be replaced with the battery pack 102 or battery module 104 mounted in place and/or require removal of same, but can otherwise be built into the airframe/wing and thus separately replaceable. In variants, the safety relief valve can prevent undesired activation and/or rupture of the burst membrane when a thermal event is not occurring. However, a safety relief valve can be otherwise suitably implemented in conjunction with the burst membrane and/or venting system. However, the venting system can be otherwise suitably implemented and can include any other suitable components and/or features.

Figure 9:
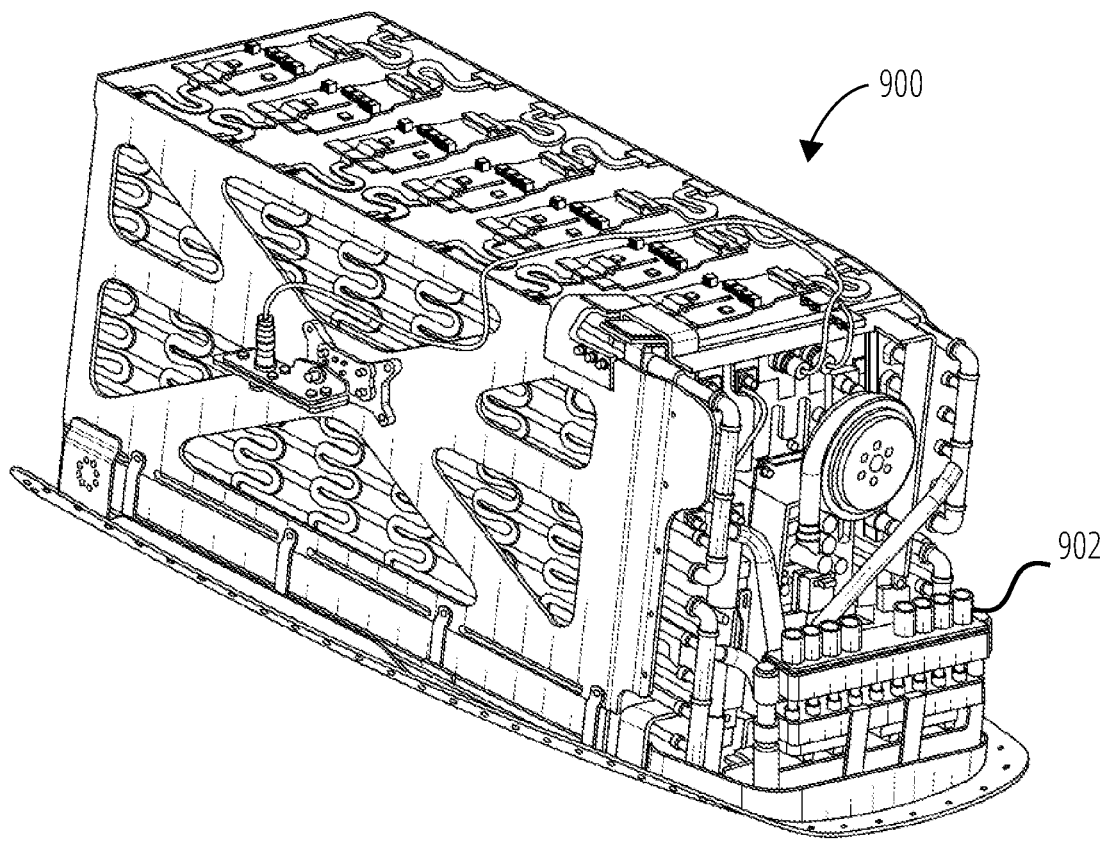
FIG. 9 is a perspective view of a battery pack for use in the system of FIG. 1 according to one example.
Figure 10:
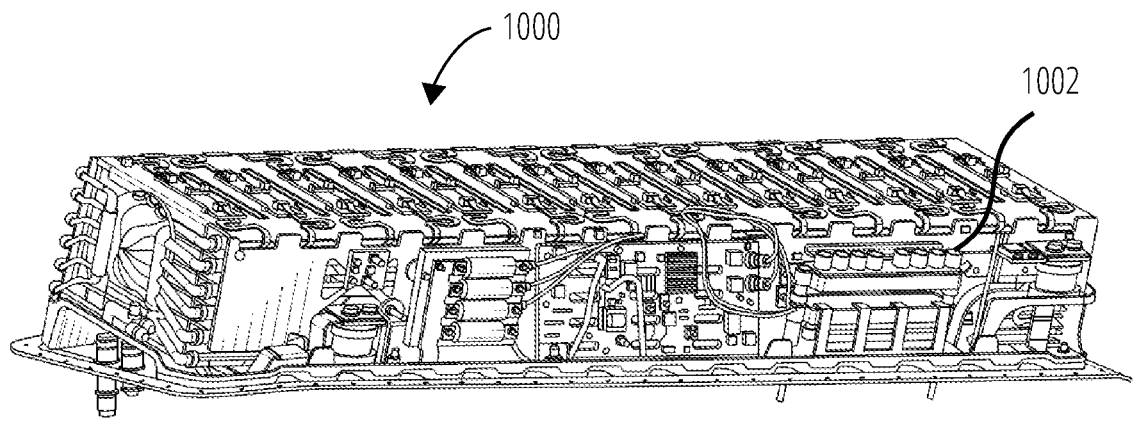
FIG. 10 is a perspective view of a battery pack for use in the system of FIG. 1 according to another example.

FIG. 9 and FIG. 10 respectively show perspective views of a battery pack 900 and a battery pack 1000 for use in a system 100 in some examples. Battery pack 900 and battery pack 1000 can optionally include a battery mate 902 or battery mate 1002 respectively that function to couple a battery pack to a remainder of the energy system. The battery mate preferably includes a battery-side connector and a vehicle-side connector (e.g., corresponding male and female connectors).

The battery-side connector can be arranged on the top face, bottom face, broad face, narrow face, spanwise face, chordwise face, inboard face, outboard face, front face, back face, and/or any other suitable side, face, and/or vertex of the battery pack 900 or battery pack 1000. The battery-side connector can be arranged on a single battery module 104 (e.g., on the end of the pack) and/or distributed between multiple battery modules 104, shared/split between a battery pack 1000 mounted within an airfoil cross section and a nacelle mounted battery pack 900, and/or otherwise suitably configured. The battery-side connector can be within one or more battery enclosures and/or arranged an exterior of the battery pack 900 or battery pack 1000.

The vehicle-side connector (e.g., a snorkel connector) can be sealed relative to the aircraft environment in any suitable manner. The vehicle side connector can include: a fluid seal (e.g., sealed from the vehicle and/or ambient environment), electrical protections (e.g., insulation), thermal protections (e.g., thermal insulation, fire-resistant materials, etc.), vibration protections, EMI shielding, ingress protections, and/or any other suitable protections. Preferably, the vehicle-side connector is arranged to minimize the wiring and/or tubing length onboard, and can be arranged on the inboard side, outboard side, top, bottom, and/or in any other suitable location relative to the battery pack.

The battery mate 902 or battery mate 1002 can be aligned in any suitable manner. The battery mate can be: self-aligning—allowing and/or correcting misalignment within a threshold (e.g., 1 mm, 5 mm, 1 cm, etc.; including a spring or other compliance mechanism; etc.), aligned by external features, manually aligned, and/or otherwise suitably aligned.

The battery mate 902 or battery mate 1002 can include a fastening mechanism, which functions to secure and/or retain the battery-side to the vehicle side. The fastening mechanisms can be configured to independently, synchronously, and/or simultaneously connect the battery-side connector to the vehicle side connector. The fastening mechanism can be automatic (e.g., engaged upon battery insertion and/or mounting), manual, and/or otherwise configured. Preferably, the fastening mechanism allows assembly without the use of additional tools (e.g., beyond devices used to lift and/or fasten the battery), soldering, crimping, waterproofing (e.g., application of locking fluids or Teflon tape), but can be configured to assemble with such instruments. The fastening mechanism preferably connects via a linear motion (e.g., same direction as insertion, orthogonal to insertion direction), such as with snap-fit connections, jacks, plugs, push-pull, sliding connectors, and/or any other linear motion connectors.

Additionally or alternatively, the battery mate 902 or battery mate 1002 can connect via a rotational motion such as a screw locking mechanism, bayonet connector, and/or any other suitable rotation locking mechanism. Alternately, the battery mate 902 or battery mate 1002 can include no locking mechanism directly retaining the vehicle-side connector relative to the battery-side connector, and instead can rely on the mechanical fastening of the battery and/or fixed position of the vehicle side relative to the battery sides (e.g., monolithic battery and battery-side connector are fixed relative to the airframe and the vehicle-side connector is fixed relative to the airframe). In variants, the battery-side and/or vehicle-side connectors can float (e.g., semi-rigid, non-rigid, adjust, etc.) relative to the battery mounting and/or other rigid aircraft components, which can enable a user (or assistive devices) to easily engage the battery mate 902 or battery mate 1002 during assembly.

In variants, the fastening mechanism and/or alignment of the battery mate can allow engagement of the mate without a visual line of sight to the vehicle-side connector, battery side connector, and/or battery pack. In a specific example, the battery mate includes blind mate connectors. However, the battery mate can include any other suitable features and/or can be otherwise suitably implemented.

Figure 11:
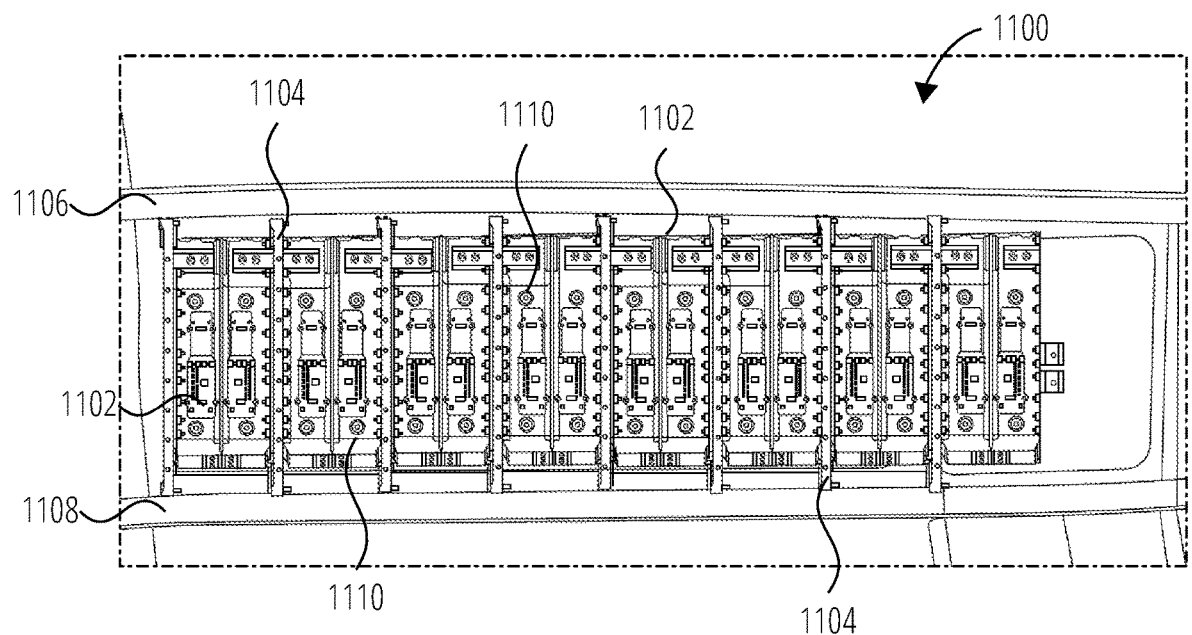
FIG. 11 is a cutaway plan view of a wing of the rotorcraft of FIG. 2 showing a battery pack mounted therein according to one example.

FIG. 11 is a cutaway plan view of an example of a wing 1100 of the rotorcraft 200 showing battery packs 1102 mounted therein. In this example, the battery pack 1102 is mounted to the wing ribs 1104. An installed battery pack 1102 defines a battery pack span, which is the total dimension of the battery pack 1102 in a left to right direction in FIG. 11. The battery pack span can extend between two ribs, with no intervening ribs, or the battery pack 1102 can span one or more intervening ribs 1104 as shown in FIG. 10. In a specific example, the battery pack 1102 includes a number (N) battery modules 1110, and the number of intervening ribs on the access hole breadth is proportional to the number of modules: there can be N−1 ribs, N+1 ribs, and/or any other suitable number of ribs 1104 spanned by the battery pack 1102. In the second variant, the battery pack can additionally or alternately be mounted to spars 1106 and/or spars 1108 and/or pinned to an upper surface of the wing (e.g., to improve vibration characteristics).

In a first example, the battery pack 1102 and/or battery modules 1110 can be packaged as fully enclosed structures with ingress and/or thermal protections. In a second example, the battery pack and/or modules are not fully enclosed and/or thermally protected until they are mounted (e.g., with a separate closeout covering the access hole). In the second variant, the battery pack is electrically incomplete before mounting and/or installation. Battery modules 1110 can be electrically connected in series to cooperatively generate a pack voltage (e.g., after they are mounted, during mounting). Preferably, the battery modules 1110 are connected in a manner to minimize the number of high-voltage fastening operations (e.g., only one fastening operation above half-pack voltage, fewer than half of fastening operations above half-pack voltage, etc.), but can be connected in any suitable manner.

Figure 12:
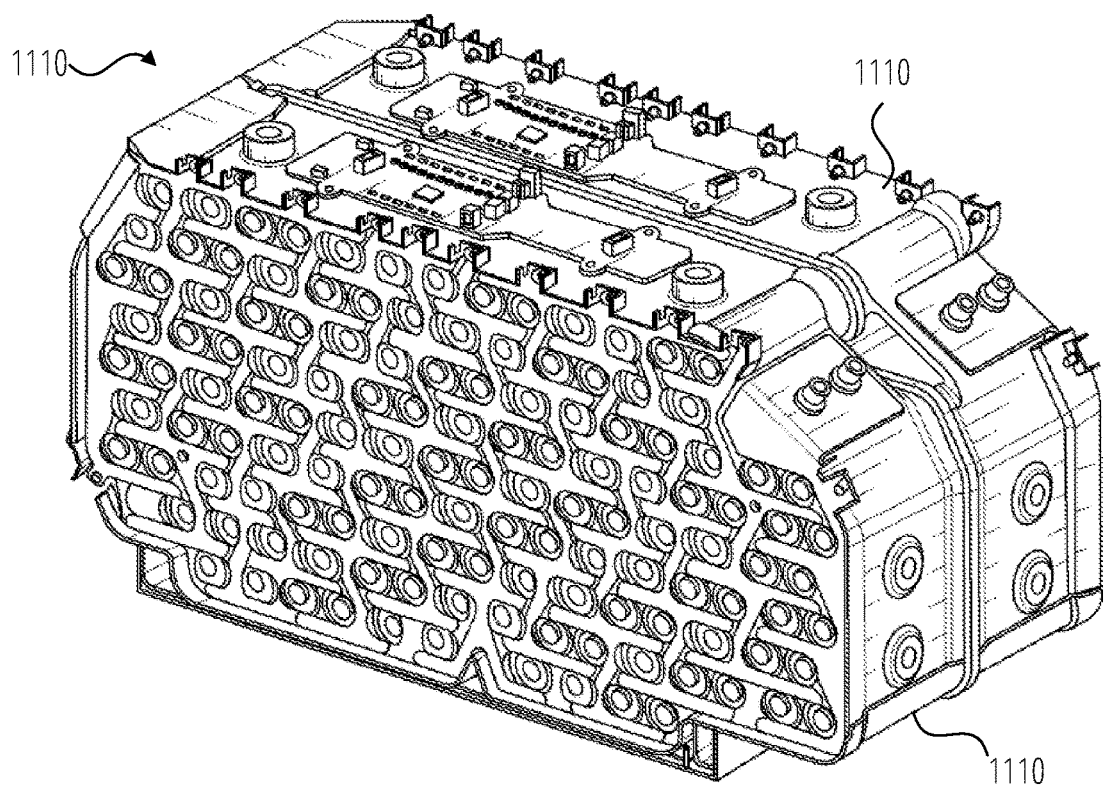
FIG. 12 is a perspective view of a battery module from the battery pack of FIG. 11 according to one example.

FIG. 12 is a perspective view of the battery module 1110 from the battery pack 1102 of FIG. 11.

Figure 13:
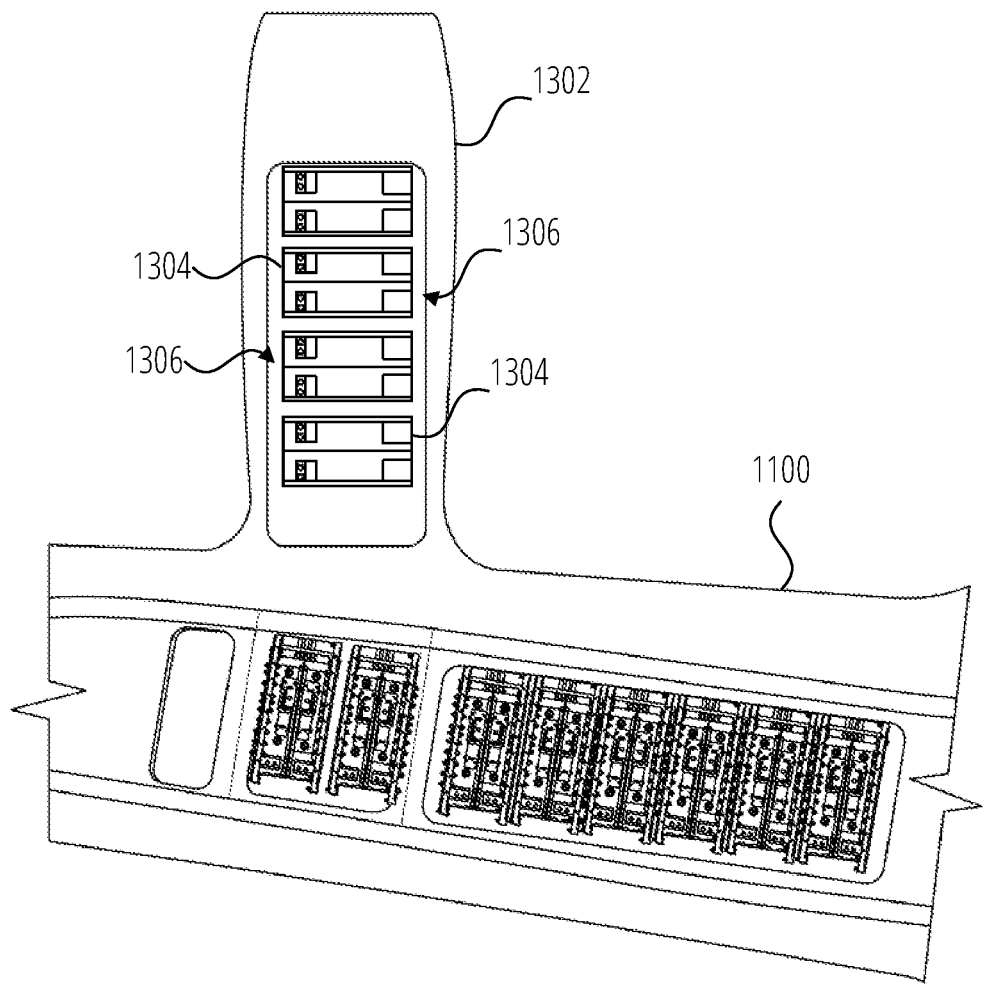
FIG. 13 is a cutaway plan view of an example of a wing and nacelle of the rotorcraft of FIG. 2 showing battery packs mounted therein according to one example.

FIG. 13 is a cutaway plan view of an example of a wing 1100 and nacelle 1302 of the rotorcraft 200 showing battery packs mounted therein. As can be seen from the figure, nacelle battery pack 1306 comprises a number of battery modules 1304. The battery pack 1306 and/or battery modules 1304 can be packaged as fully enclosed structures with ingress and/or thermal protections. In a second example, the battery pack 1306 and/or battery modules 1304 are not fully enclosed and/or thermally protected until they are mounted (e.g., with a separate closeout covering an access hole). In the second variant, the battery pack 1306 is electrically incomplete before mounting and/or installation. Battery modules 1304 can be electrically connected in series to cooperatively generate a pack voltage (e.g., after they are mounted, during mounting). Preferably, the battery modules 1304 are connected in a manner to minimize the number of high-voltage fastening operations (e.g., only one fastening operation above half-pack voltage, fewer than half of fastening operations above half-pack voltage, etc.), but can be connected in any suitable manner.

Nacelle-mounted battery packs 1306 or battery modules 1304 can have any suitable geometry. Preferably, a frontal cross section of the nacelle-mounted battery pack is circumscribed by the nacelle geometry, which can reduce/minimize a frontal area of the nacelle and an associated drag influence, however the pack can alternately be optimized to reduce the exposed (exterior) surface area of the nacelle, or be otherwise to reduce the drag influence of the nacelle. The nacelle geometry can alternately be modified to accommodate a nacelle-mounted battery pack, and can include a circular cross section on a frontal portion of the nacelle tapering and/or lofting into a rectangular cross section (mounting to the wing)—that can improve aerodynamic and/or packaging efficiency. Preferably, the nacelle-mounted battery pack width is within a threshold percentage difference of the height (e.g., for a frontal cross section, spanwise width, vertical height, etc.), which can be within 50%, 25%, 15%, 10%, 5%, equal, and/or any other threshold difference. The nacelle-mounted battery pack geometry can be defined by a single battery pack, a single battery module, and/or cooperatively defined by a plurality of modules. In a specific example, a nacelle-mounted battery pack volume is within a threshold difference of a wing-mounted battery pack volume, which can be 5%, 10%, 20%, 50%, exactly equal, and/or any other suitable volume difference.

Figure 14:
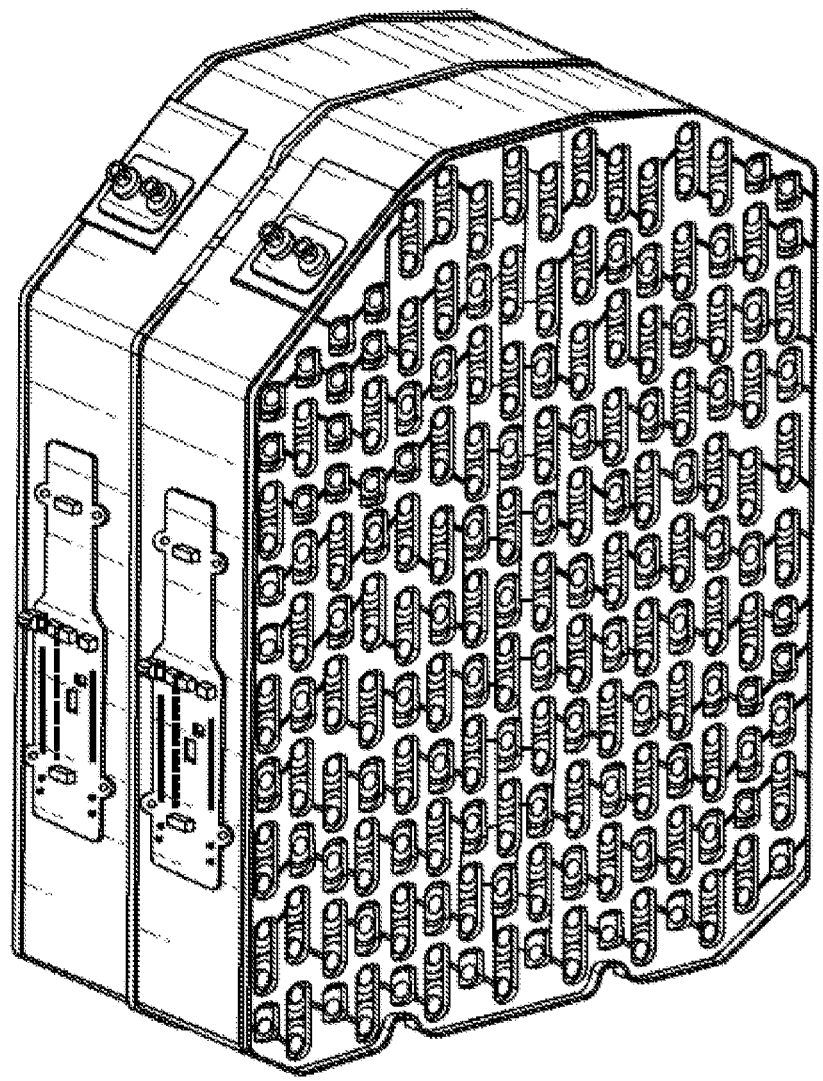
FIG. 14 is a perspective view of the battery module from the nacelle battery pack of FIG. 12.

FIG. 14 is a perspective view of the battery module 1304 from the battery pack 1306 of FIG. 13.

Figure 15:
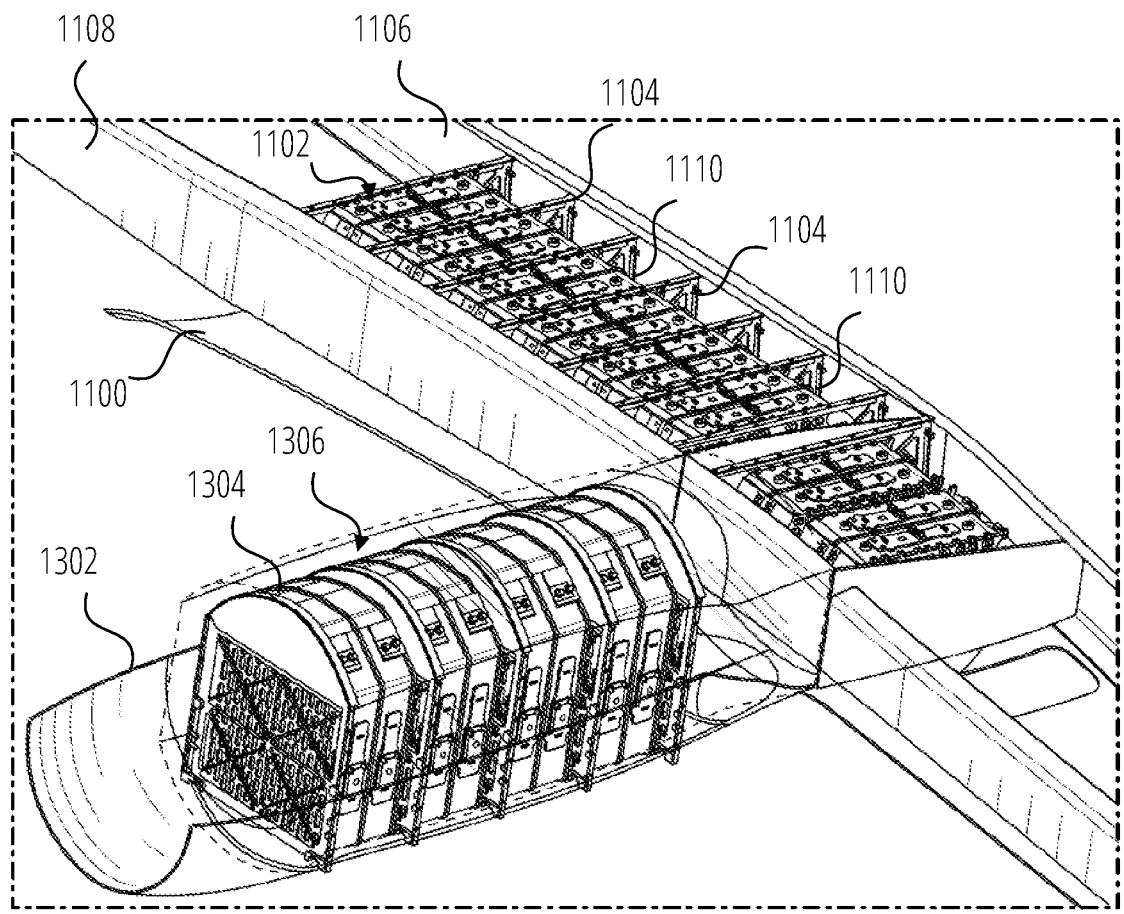
FIG. 15 is a cutaway perspective view of the wing and nacelle of FIG. 13.

FIG. 15 is a cutaway perspective view of the wing 1100 and nacelle 1302 of FIG. 13, illustrating the battery modules 1110 of battery pack 1102 mounted between ribs 1104, spar 1106 and spar 1108, and battery modules 1304 of battery pack 1306 mounted in nacelle 1302.

Figure 16:
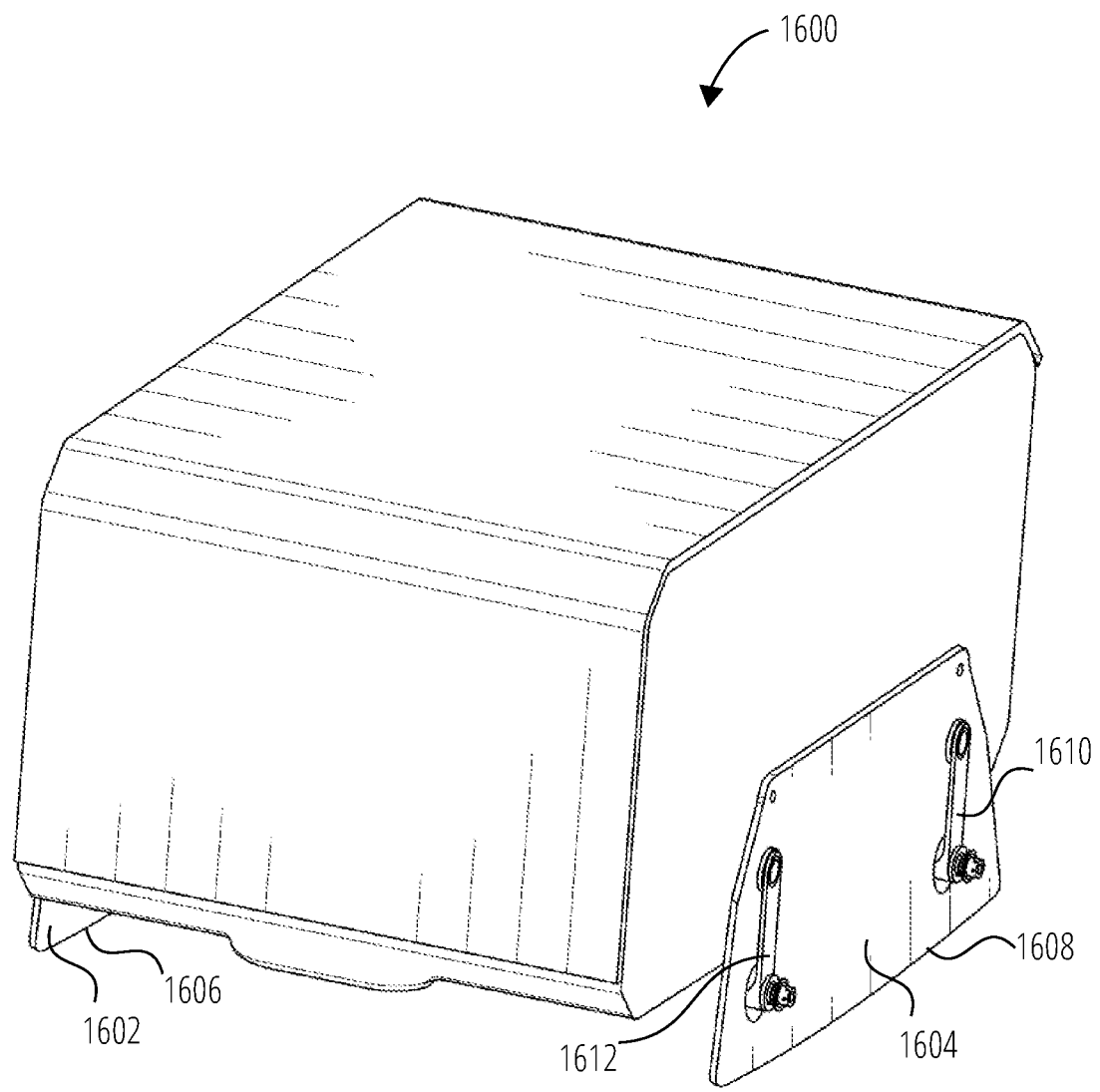
FIG. 16 is a perspective view of a battery pack and associated mounting brackets for use in the system of FIG. 1 according to another example.

FIG. 16 is a perspective view of a battery pack 1600 and associated mounting brackets for use in the system of FIG. 1 according to another example. The battery pack 1600 is a wing-mounted battery pack for a rotorcraft 200, mounted in the wing 1804 that is illustrated in more detail in FIG. 18. For purposes of clarity, not all structure associated with the battery pack 1600 has been illustrated in FIG. 16.

The battery pack 1600 is mounted to wing ribs 1806 or other fore-aft supporting structures in the wing using a mounting bracket 1602 and a mounting bracket 1604. The battery pack 1600 is rigidly mounted on one side to mounting bracket 1602 (partially obscured in the figure), which is in turn mounted to a rib 1806 or other fore-aft mounting structure in the wing 210 along a lower edge 1606. Mounting bracket 1602 has the same general appearance as mounting bracket 1604, with the exception that mounting bracket 1604 provides a rigid connection (practically speaking) between the battery pack 1600 and a rib 1806 or other structure on which the mounting bracket 1602 is mounted, while mounting bracket 1604 provides rotational movement and/or rotational compliance between battery pack 1600 and mounting bracket 1604 as discussed below.

Mounting bracket 1604 includes two elongate, spaced-apart connecting links, which in the illustrated example take the form of hanger 1610 and hanger 1612, which are rotationally coupled to the mounting bracket 1604 at an upper end and rotationally coupled to the battery pack 1600 at a lower end. Mounting bracket 1604 is also mounted to a rib 1806 or other fore-aft mounting structure in the wing 210 along a lower edge 1608. The rotational coupling between the hanger 1610/hanger 1612 and the battery pack 1600 and between the hanger 1610/hanger 1612 and the mounting bracket 1604 need not provide complete rotational freedom, as long as sufficient rotation or rotational compliance is provided to permit relative motion between the mounting brackets and battery pack as described herein, without transmitting undue forces to the battery pack 1600

Figure 17A:
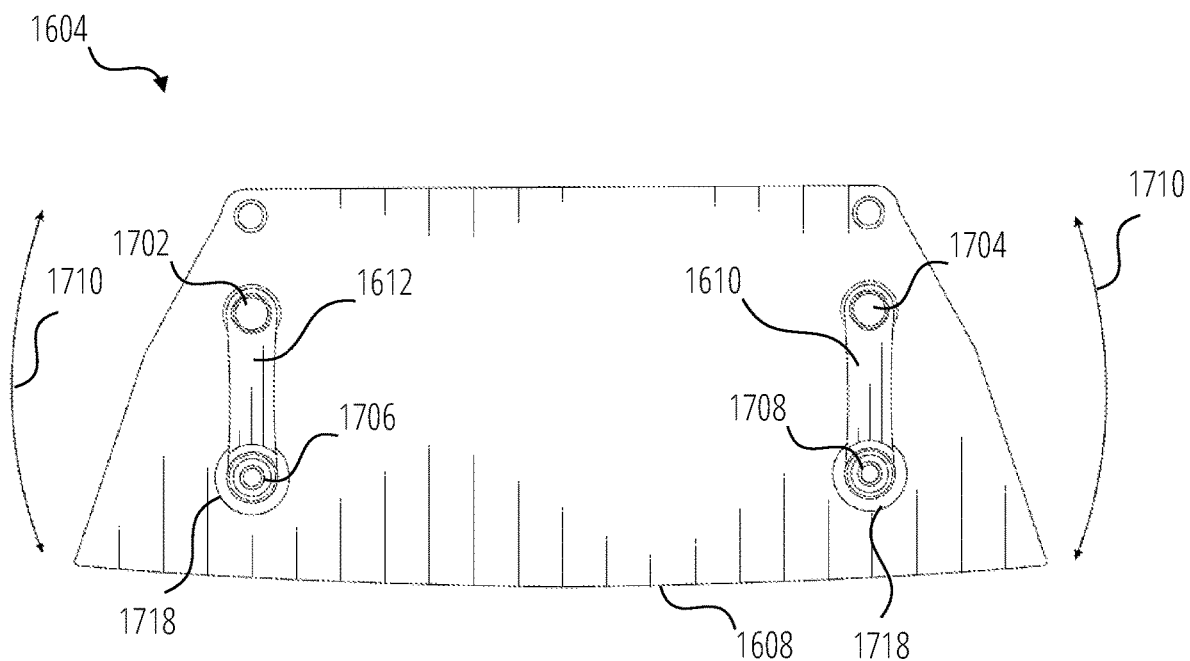
FIG. 17A is a plan view of the right hand side mounting bracket of FIG. 16.
Figure 17B:
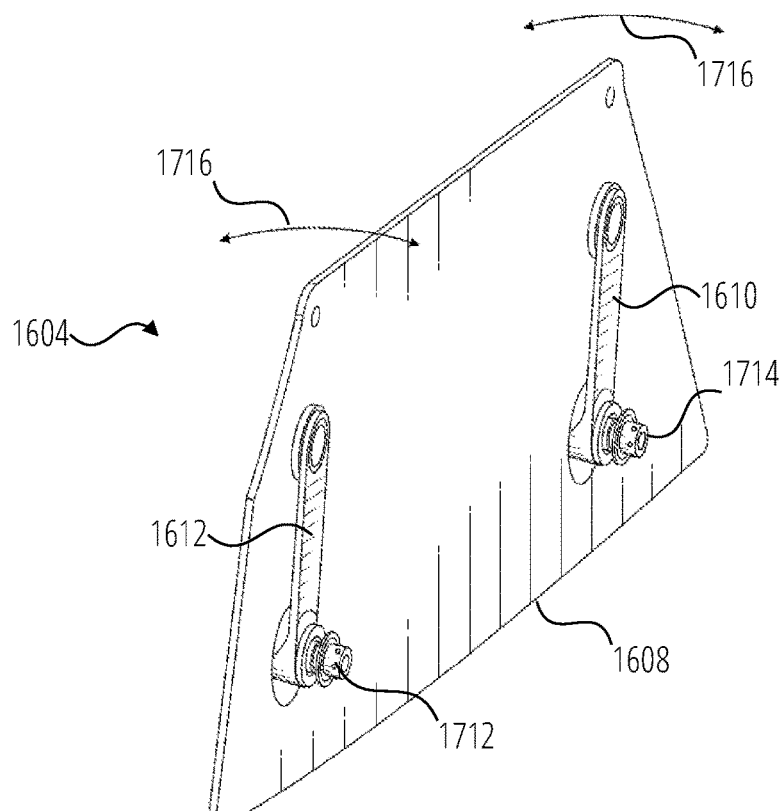
FIG. 17B is a perspective view of the mounting bracket of FIG. 17A.

FIG. 17A is a plan view of the right hand side mounting bracket 1604 of FIG. 16 and FIG. 17B is a perspective view of the mounting bracket 1604 of FIG. 17A. As can be seen from the figures, hanger 1612 is coupled to the mounting bracket 1604 at an upper end by rotational coupling 1702 and is coupled to a shaft 1712 at its lower end by rotational coupling 1706. The shaft 1712 is in turn coupled to the battery pack 1600. Likewise, hanger 1610 is coupled to the mounting bracket 1604 at an upper end by rotational coupling 1702 and is coupled to a shaft 1714 at its lower end by rotational coupling 1708. The shaft 1714 is in turn coupled to the battery pack 1600. The rotational couplings in one example may be bearings, such as a sleeve or other bearing, but may be any other suitable rotational coupling.

Holes 1718 are provided in mounting bracket 1604 through which the lower ends of the hanger 1610 and hanger 1612 pass (including shaft 1712, shaft 1714 and rotational coupling 1706 and rotational coupling 1708) with sufficient clearance to allow the hanger 1610 and hanger 1612 to rotate relative to mounting bracket 1604 about rotational coupling 1702 and rotational coupling 1704 to a sufficient degree to accommodate flexing of the wing 1804 as discussed below.

Hanger 1610 and hanger 1612 are generally oriented vertically when the rotorcraft 200 is parked and/or cruising, so that the weight of the battery on the right side (in FIG. 16) is supported by tension in hanger 1610 and hanger 1612. As mentioned above, the mounting bracket 1602 supporting the left side of the battery pack 1600 provides an effectively rigid connection between the battery pack 1600 and the rotorcraft 200. The mounting points on the left and right sides of the battery pack 1600 are symmetrically positioned with respect to each other.

Since the mounting bracket 1604 and the mounting bracket 1602 are oriented in a fore-aft direction of the wing 1804, twisting of the wing 1804 will tend to cause rotation of mounting bracket 1604 with respect to mounting brackets 1602 as shown by arrows 1710 in FIG. 17A. When this occurs, mounting bracket 1604 will similarly rotate with respect to battery pack 1600 without transmitting twisting forces to battery pack 1600, due to rotation of hanger 1610 and hanger 1612 relative to mounting bracket 1604 that is permitted by the rotational coupling 1702, rotational coupling 1704, rotational coupling 1706 and rotational coupling 1708.

Similarly, bending of the wing 1804 will cause mounting bracket 1604 to tip towards or away from mounting bracket 1602 as shown by arrows 1716. Due to the length and thinness (comparatively low area moment of inertia) of the hanger 1610 and hanger 1612, they are able to bend around the fore-aft axis of the wing, to accommodate this relative movement of the mounting brackets, without transmitting undue forces to the battery pack 1600. In an alternative example, the rotational couplings may be selected or configured to permit relative rotation of the mounting bracket 1604 with respect to the battery pack 1600 as indicated by arrows 1716. For example, rotational coupling 1706 and rotational coupling 1708 may be ball joints in such a case.

Figure 18:
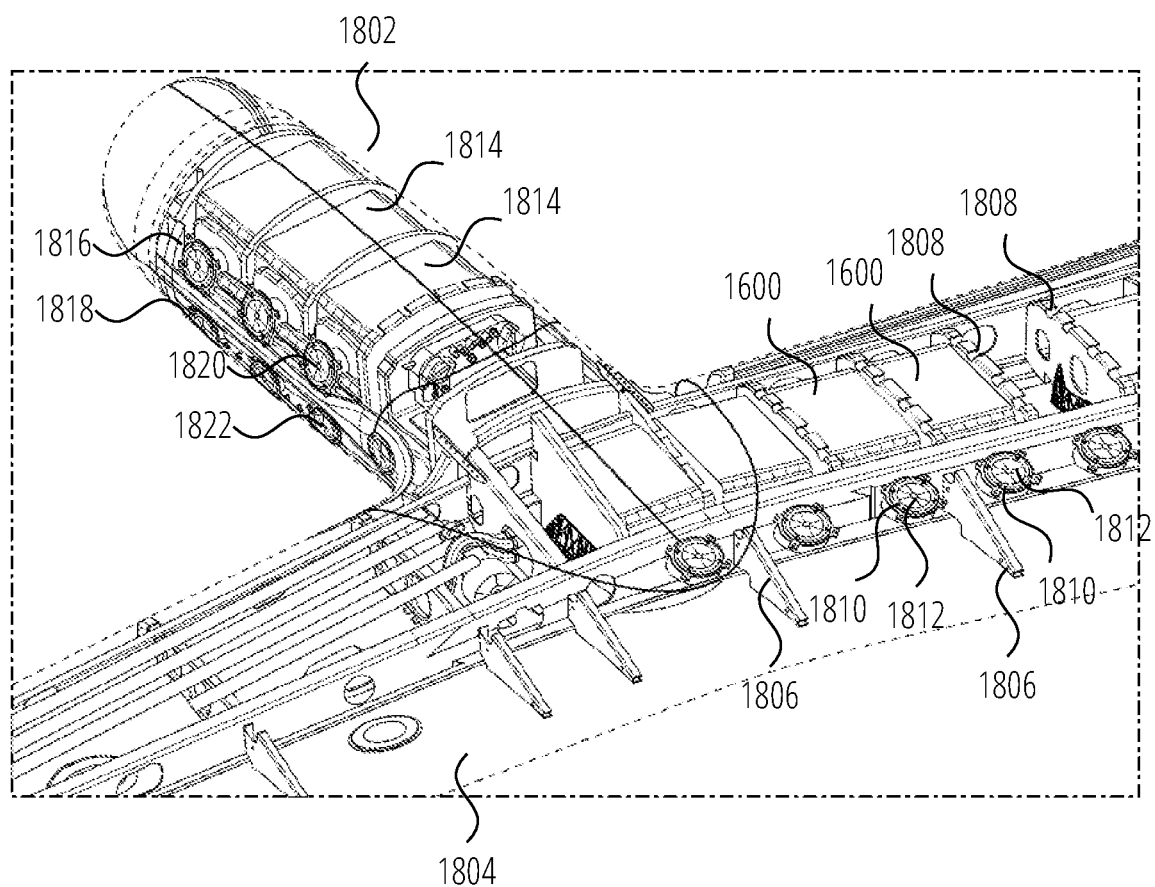
FIG. 18 is a perspective view of part of a wing and nacelle for use in the rotorcraft of FIG. 2 according to another example.

FIG. 18 is a perspective view of part of a wing 1804 and nacelles 1802 for use in the rotorcraft 200 of FIG. 2 according to another example. As can be seen, the wing 1804 includes a number of ribs 1806, between which are mounted a number or battery packs 1600, as described above with reference to FIG. 17A and FIG. 17B. In this example there are two battery packs 1600 between each pair of ribs 1806. Additional structure, such as mounting plates 1808 may be provided to permit mounting and support of the battery packs 1600 to or between the ribs 1806.

Also provided on an upper rear surface of the wing are a plurality of vent outlets 1810 and burst membranes 112, one for each battery pack 1600 in this example, although more or less are contemplated as discussed above. The vent outlets 1810 are preferably located on the upper rear surface of the wing since this positioning will direct any discharge resulting from a thermal event involving a battery pack 1600 to be directed up and away from the underside of the rotorcraft 200, where people may be located if the rotorcraft 200 is on the ground. Additionally, directing any discharge into the low pressure area above and to the rear of the wing 1804 will reduce the effect of the discharge on the aerodynamic functioning of the wing 1804 in flight.

The nacelle 1802 includes a plurality of upper nacelle battery packs 1814 and lower nacelle battery packs 1902 (not visible in FIG. 18). Also provided on the side of the nacelle 1802 are a plurality of upper vent outlets 1816 and burst membranes 1820, one for each battery pack 1814, and a plurality of lower vent outlets 1818 and burst membranes 1822, one for each battery pack 1902 in this example, although more or less are contemplated as discussed above. The vent outlets 1810 are preferably located on the side of the nacelle 1802 that is away from the fuselage 212 of the rotorcraft 200 (i.e. on the outboard side of nacelle 1802), so that any discharge resulting from a thermal event involving a nacelle battery pack is directed away from the cabin of the rotorcraft 200.

The configuration and mounting of vent outlets 1810, vent outlets 1816 and vent outlets 1818 may result in an irregular surface on the wing 1804 or nacelle 1802. To provide a smooth surface for drag reduction, a fairing may be provided over the vent outlets. In one example, a frangible filling agent such as a filler foam or other filling compound may be applied to the vent outlets, which can then be finished and painted to provide a smooth surface. Other fairing options may also be provided such as a thin membrane or removable cover or panel.

Figure 19:
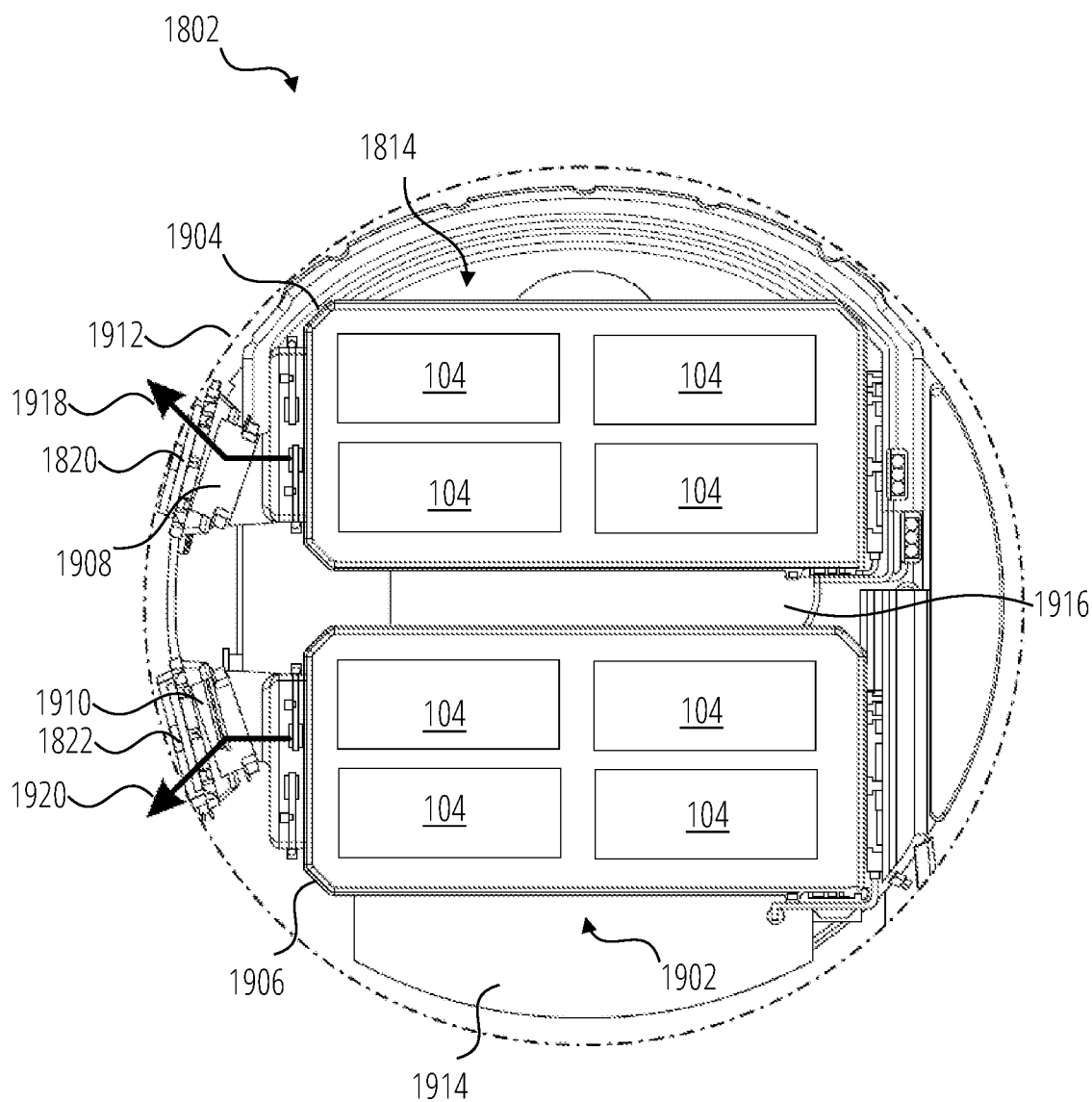
FIG. 19 is a cross-sectional view of the nacelle of FIG. 18.

FIG. 19 is a cross-sectional view of the nacelle of FIG. 18. As can be seen from the figure, battery pack 1814 includes a plurality of battery modules 104 and an enclosure 1904. The battery pack 1814 is mounted to transverse supporting structures in the nacelle 1802 by means of two mounting brackets 1916 in the same manner as the battery pack 1600 is mounted to the ribs 1806 or other supporting structures in the wing 1804. Similarly, the mounting brackets 1916 serve to reduce or isolate the battery pack 1814 from twisting or bending experienced by the nacelle 1802 as discussed above with reference to the wing in FIG. 17A and FIG. 17B. A vent 1908 is coupled to the enclosure 1904 at one end thereof. The vent 1908 in turn is coupled to the nacelle 1802 adjacent to the nacelle skin 1912. The coupling of the vent 1908 to the nacelle 1802 is a flexible coupling, which permits a degree of relative movement between the battery pack 1814 and the nacelles 1802 if and when the nacelle 1802 bends or twists. The flexible coupling may be formed by including one or more elastomeric components. In one example the flexible coupling may be a rubber expansion joint.

The enclosure 1904 serves to contain any discharge from the battery modules 104 and direct it towards the vent 1908. Clearances between the battery modules 104 and the enclosure 1904 and between the battery modules 104 themselves may define pathways through which discharge may flow, for example from the side of the battery modules 104 opposite the vent 1908 towards the vent 1908. As before, the vent 1908 at least partly provides a vent path 1918, normally closed by the burst membrane 1820, for directing any thermal event discharges out of the nacelle 1802.

Similarly, lower battery pack 1902 includes a plurality of battery modules 104 and an enclosure 1906. The battery pack 1902 is mounted to transverse supporting structures in the nacelle 1802 by means of two mounting brackets 1914, which also serve to reduce or isolate the battery pack 1814 from twisting or bending experienced by the nacelle 1802. A vent 1910 is coupled to the enclosure 1906 at one end thereof and to the nacelle 1802 adjacent to the nacelle skin 1912. The coupling of the vent 1908 to the nacelle 1802 is a flexible coupling, which permits a degree of relative movement between the battery pack 1814 and the nacelles 1802 if and when the nacelle 1802 bends or twists. The flexible coupling may be formed by including one or more elastomeric components. In one example the flexible coupling may be a rubber expansion joint.

The enclosure 1906 serves to contain any discharge from the battery modules 104 and direct it towards the vent 1910. Clearances between the battery modules 104 and the enclosure 1906 and between the battery modules 104 themselves may define pathways through which discharge may flow, for example from the side of the battery modules 104 opposite the vent 1910 towards the vent 1910. As before, the vent 1910 at least partly provides a vent path 1920, normally closed by the burst membrane 1822, for directing any thermal event discharges out of the nacelle 1802.

Figure 20:
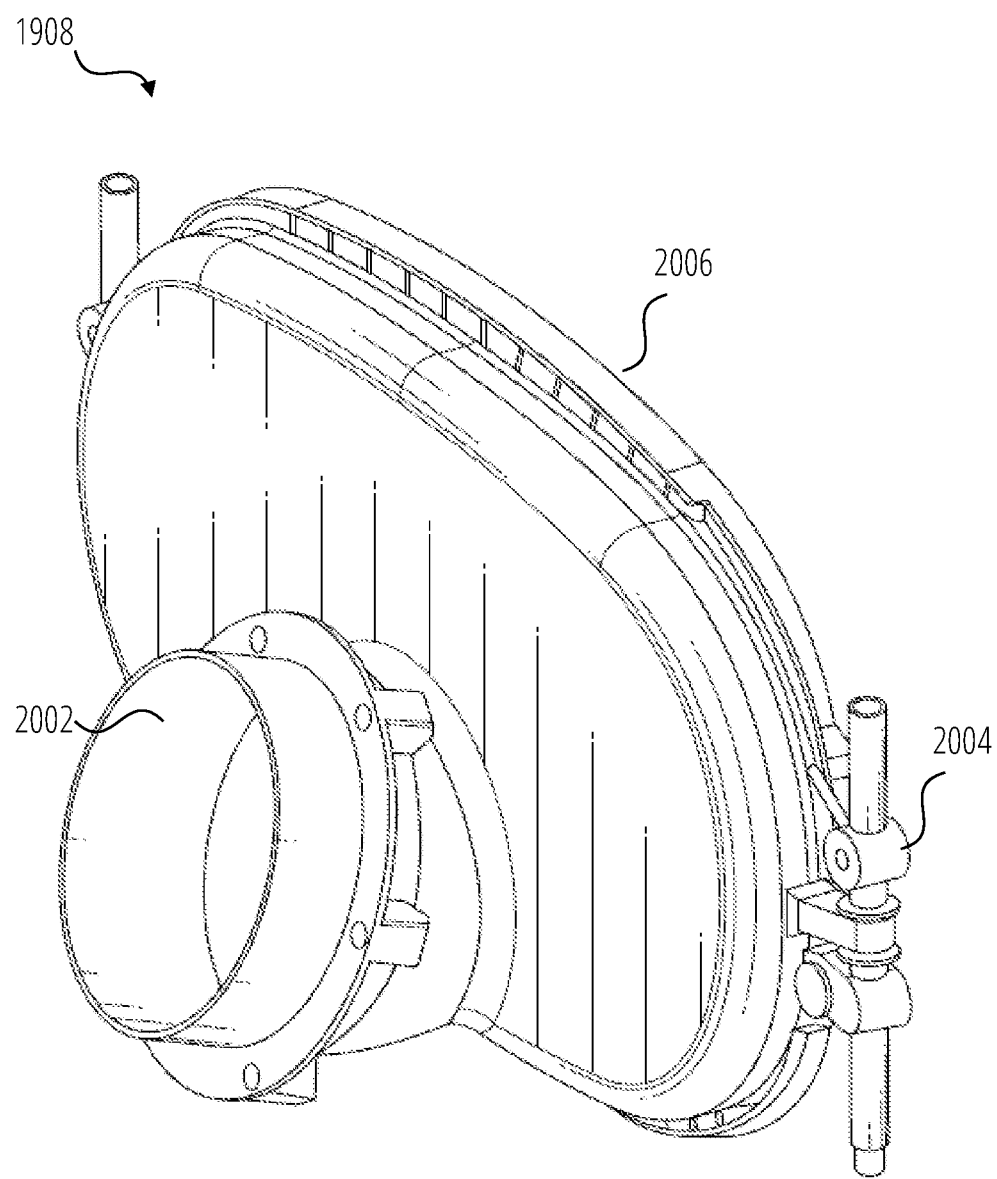
FIG. 20 is a perspective view of the vent shown in FIG. 19.

FIG. 20 is a perspective view of the vent shown in FIG. 19. The vent 1908 is illustrated as having a relatively larger inlet 2006 that is attached to the enclosure 1904 by means of a clamp 2004 and a relatively smaller outlet 2002 that is coupled to the nacelle 1802

Figure 21:
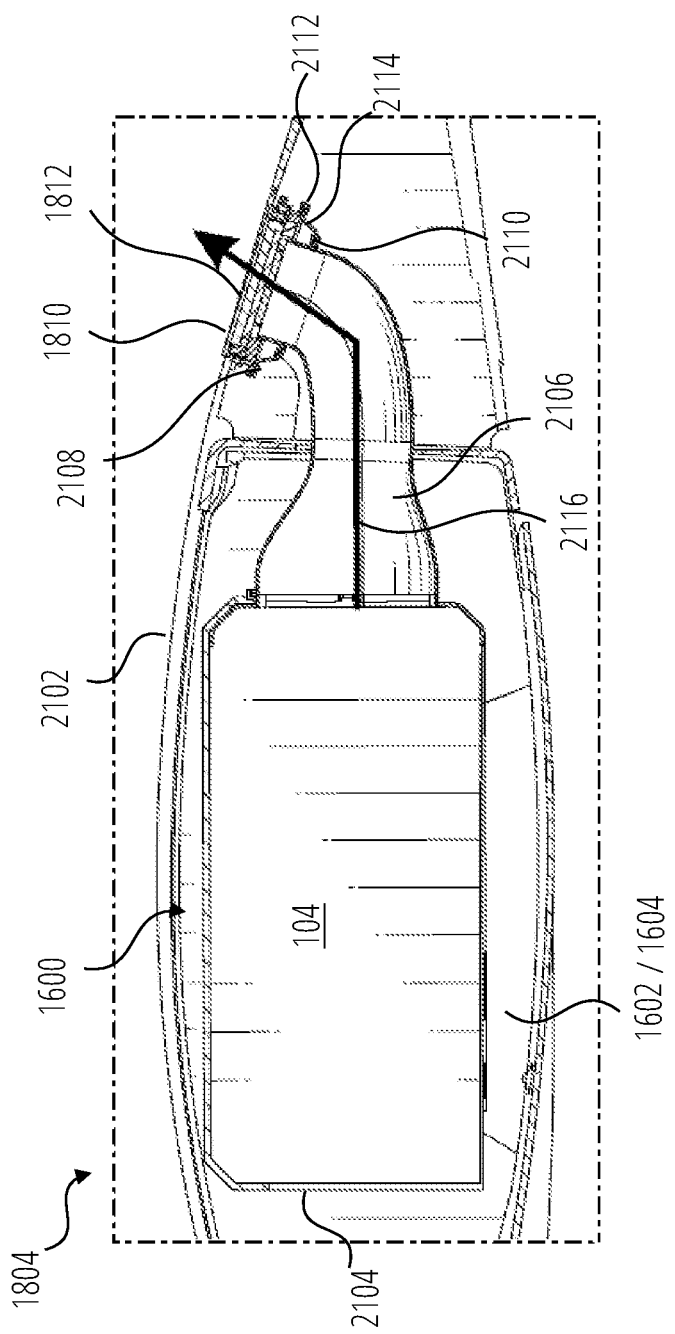
FIG. 21 is a cross-sectional view of the wing of FIG. 18.

FIG. 21 is a cross-sectional view of the wing of FIG. 18 through a wing-mounted battery pack 1600. As can be seen from the figure, battery pack 1600 includes one or more battery modules 104 and an enclosure 2104. The battery pack 1600 is mounted to wing ribs 1806 or other transverse supporting structures by means of two mounting brackets, such as mounting bracket 1602 and mounting bracket 1604 described previously. Mounting bracket 1602 and mounting bracket 1604 serve to reduce or isolate the battery pack 1600 from twisting or bending experienced by the wing 1804. A vent 2106 is coupled to the enclosure 2104 at one end thereof. The vent 2106 in turn is coupled to the wing 1804 adjacent to the wing skin 2102. The vent 2106 is coupled to the wing 1804 using a flexible coupling 2108, which permits a degree of relative movement between the battery pack 1600 and the wing 1804 if and when the wing 1804 bends or twists. In the illustrated example, the flexible coupling 2108 comprises a first ring 2110 that is fixed to the vent 2106, a second ring 2112 coupled to the wing 1804, and an elastomeric frustoconical portion 2114 between the first ring 2110 and second ring 2112.

The enclosure 2104 serves to contain any discharge from the battery modules 104 and direct it towards the vent 2106. Clearances between battery modules 104 and the enclosure 2104 and between battery modules 104 themselves may define pathways through which discharge may flow, for example in a fore-aft direction towards the vent 2106. As before, the vent 2106 at least partly provides a vent path 2116, normally closed by the burst membrane 1812, for directing any thermal event discharges out of the wing 1804.

Figure 22A:
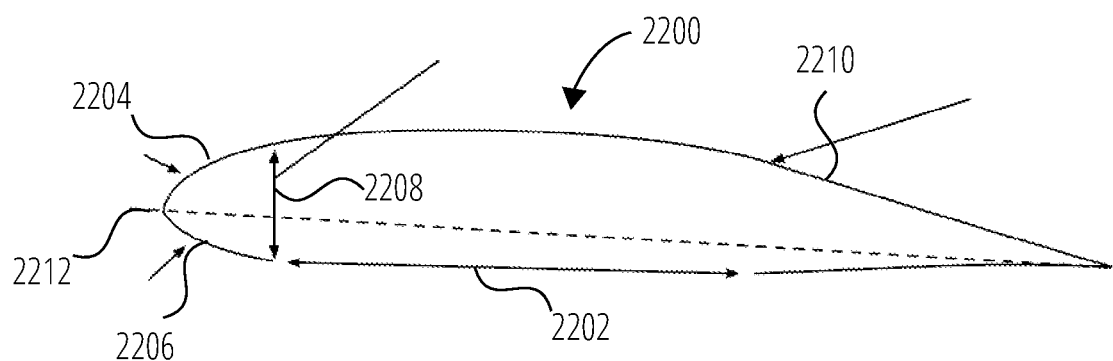
FIG. 22A, FIG. 22B and FIG. 22C are schematic representations of a cross section of a wing and an enclosed mass according to some examples.
Figure 22B:
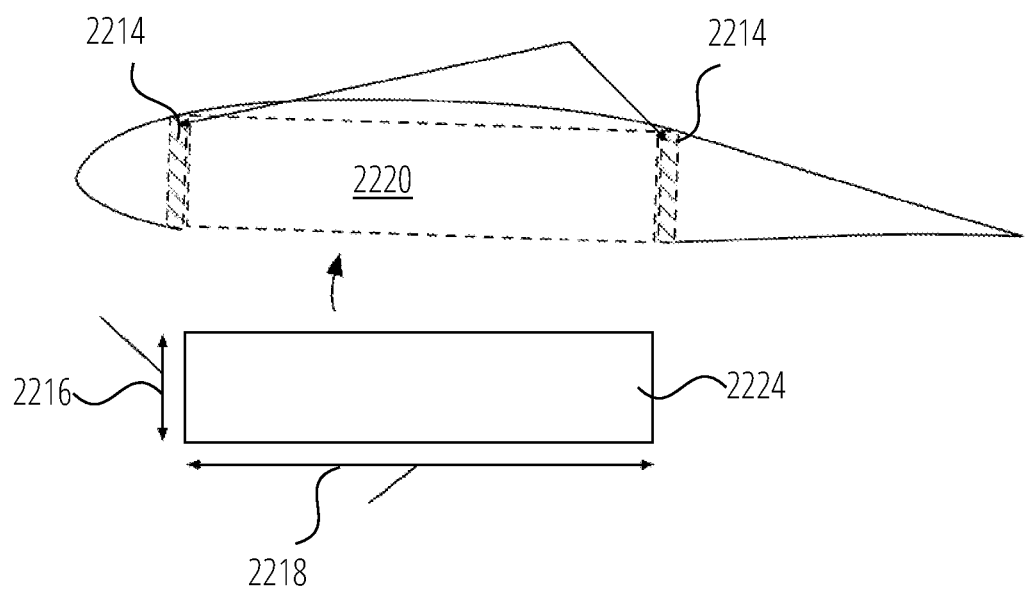
Figure 22C:
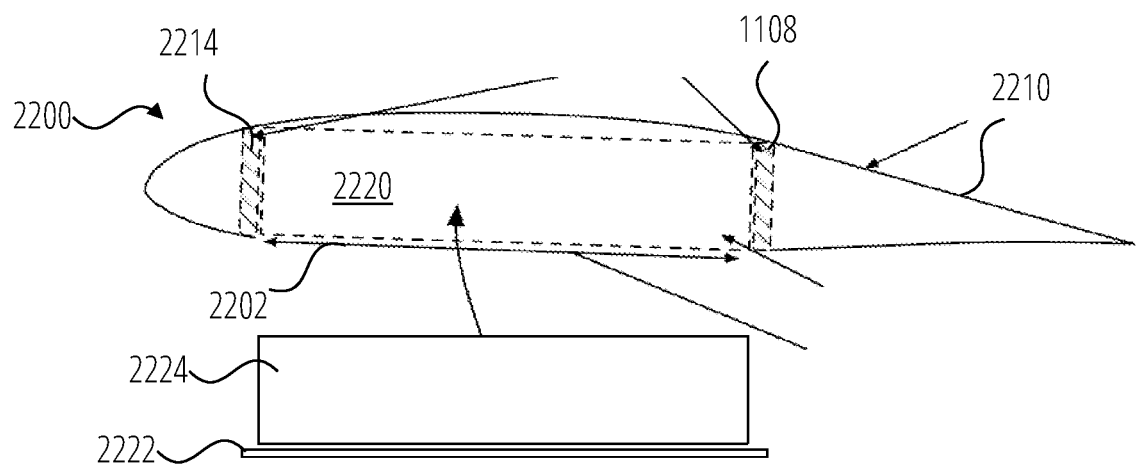

FIG. 22A, FIG. 22B and FIG. 22C are schematic representations of a cross section of a wing and an enclosed mass according to some examples. A wing 2200 may comprise a wing skin 2210 forming an upper surface 2204 and a lower surface 2206. Defined in the lower surface 2206 is an access hole 2202 through which an enclosed mass, such as battery pack 2224 may be inserted into a cavity 2220, or through which the battery pack 2224 may be accessed while in the cavity 2220. Also shown is chord line 2212, which is an imaginary straight line drawn between the leading edge and the trailing edge of the wings 2200, in the direction of the normal airflow. The wing 2200 has a wing thickness 2208.

Wing-mounted battery packs such as battery pack 2224 can have any suitable geometry. Preferably, the cross section of a wing-mounted battery pack 2224 (within the cavity 2220) is optimized to reduce the side view cross sectional area to allow the pack to fit within the internal volume of the wing, but alternately the wing and/or airfoil geometry can be modified in order to accommodate the battery pack cross sectional geometry. Additionally or alternately, airfoil cross sections can be optimized to provide desirable aerodynamic characteristics (e.g., efficient flight, high CL/CD ratio, optimized laminar to turbulent boundary transition, etc.) while packaging a wing-mounted battery pack with any suitable geometry. Preferably, the (chordwise) width of wing-mounted battery packs is less than a distance between wing spars, but can be otherwise configured. Preferably, the battery thickness 2216 thickness of wing-mounted battery packs is less than a wing thickness 2208 along an entirety of the battery pack span, but can be otherwise suitably configured. In a specific example, the battery thickness 2216 is less than a minimum wing thickness 2208 of the airfoil cross section for all chordwise points between the spars 2214 (or within the cavity) and/or within the span of the battery pack. Wing-mounted battery packs can have any appropriate span (e.g., half the wingspan, 20% of the wing span, etc.), which can be the longest dimension of the battery pack, can be a dimension of a broad face, or can have any other suitable relationship to the pack.

Battery packs 2224 and/or battery modules 104 can be inserted into the wing/nacelle in any suitable manner. In one example, a battery chordwise length 2218 of the battery pack 2224 can be less than the chordwise length of the access hole 2202. In such a case, the battery pack 2224 can be inserted directly into the wing 2200 from below through the access hole as shown in FIG. 22C, but battery packs 102 or battery modules 104 can be inserted from any suitable direction (inboard side, outboard side, top, front, rear, etc.). Battery packs 102 or battery modules 104 are preferably inserted after the skin is mounted to the spars/ribs, but can be inserted with any suitable timing during the assembly process. In variants, the base plane of the battery packs 102 or battery modules 104 can be angled relative to the ground (around any suitable axis): an anhedral/dihedral angle of the wing, a twisting angle of the wing, an attack angle of the wing, and/or other wing geometries can necessitate mounting the batteries with the base plane not parallel to the ground.

Alternatively, and as discussed in more detail below, the battery chordwise length 2218 of the battery pack 2224 can be more than the chordwise length of the access hole 2202. A closeout 2222 may be provided, which in one example comprises a baseplate 516 and a baseplate adaptor 514 as discussed above with reference to FIG. 5.

Figure 23A:
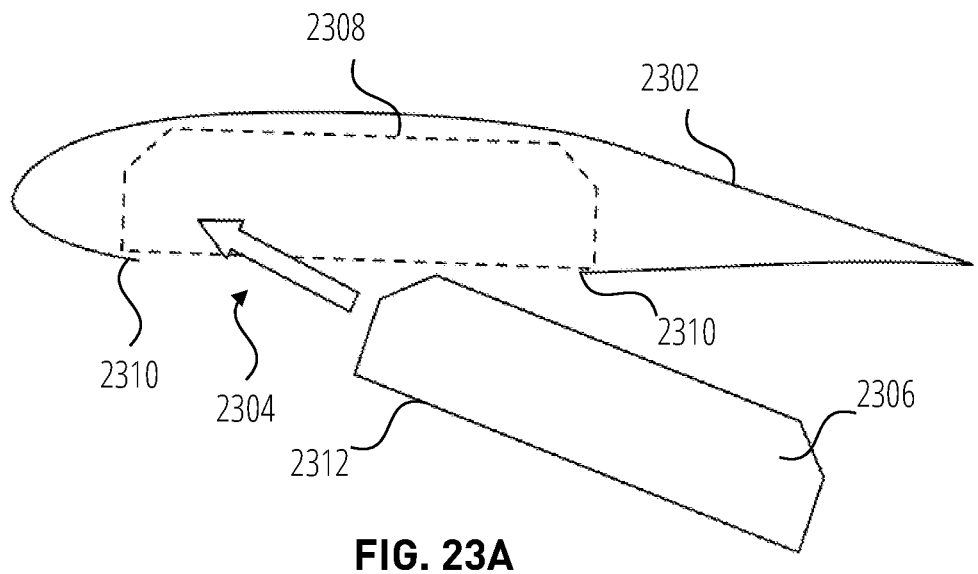
FIG. 23A, FIG. 23B and FIG. 23C are a sequence of schematic representations illustrating a method of inserting a battery pack into a wing according to one example.
Figure 23B:
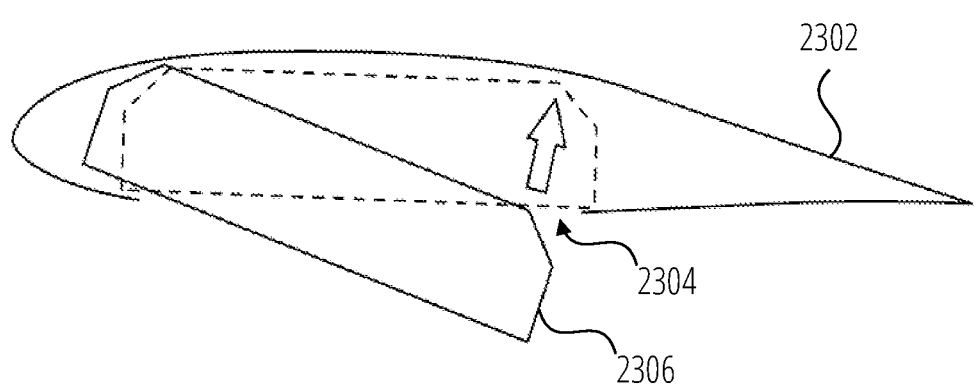
Figure 23C:
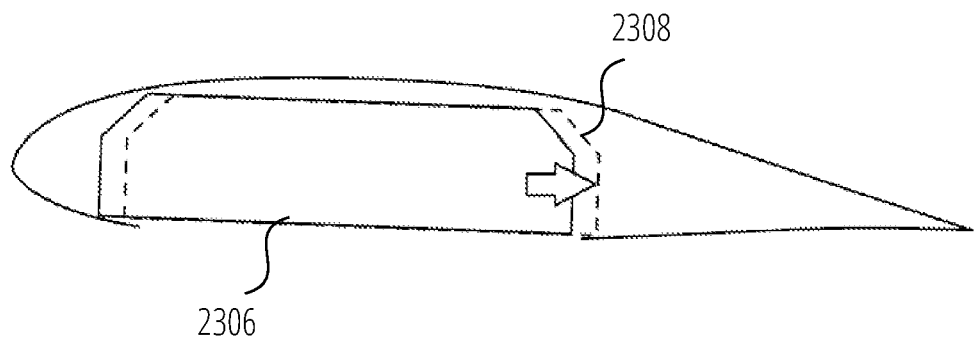

FIG. 23A, FIG. 23B and FIG. 23C are a sequence of schematic representations illustrating a method of inserting a battery pack 2306 into a wing 2302 according to one example. Battery packs or modules can be raised vertically (e.g., from below), but additionally or alternatively can be inserted at an angle and/or rotated into position. Angled insertion and rotating the battery pack/module into position can enable insertion even if a dimension of the battery exceeds a dimension of the access hole. In a specific example, a chordwise dimension of the battery pack/module can exceed a chordwise dimension of the access hole. This may provide the advantage that the edge of the battery pack can then rest on the perimeter 2310 of the access hole after assembly, providing structural support to the battery pack.

In such a case, as illustrated in FIG. 23A, the battery pack 2306 and/or battery module is initially tilted so that its base plane 2312 is at an angle relative to the access hole 2304 and to its final position 2308 (illustrated in dashed lines). The battery pack 2306 can then be inserted at an angle upward from right to left in FIG. 23A until the battery pack 2306 reaches the position shown in FIG. 23B, in which the front edge (or back edge if done in reverse) of the battery pack 2306 is further into the wing 2302 than its final position 2308. In this position the back edge of the battery pack can clear the back edge of the access hole 2304, and the back edge (or front edge if done in reverse) can be raised until the battery pack 2306 reaches the position shown in FIG. 23C, in which the battery pack 2306 is aligned with its final position but offset horizontally therefrom. The 2306 can then be moved horizontally into its final position 2308; that is, backwards into its final position 2308 in the illustrated example.

Figure 24:
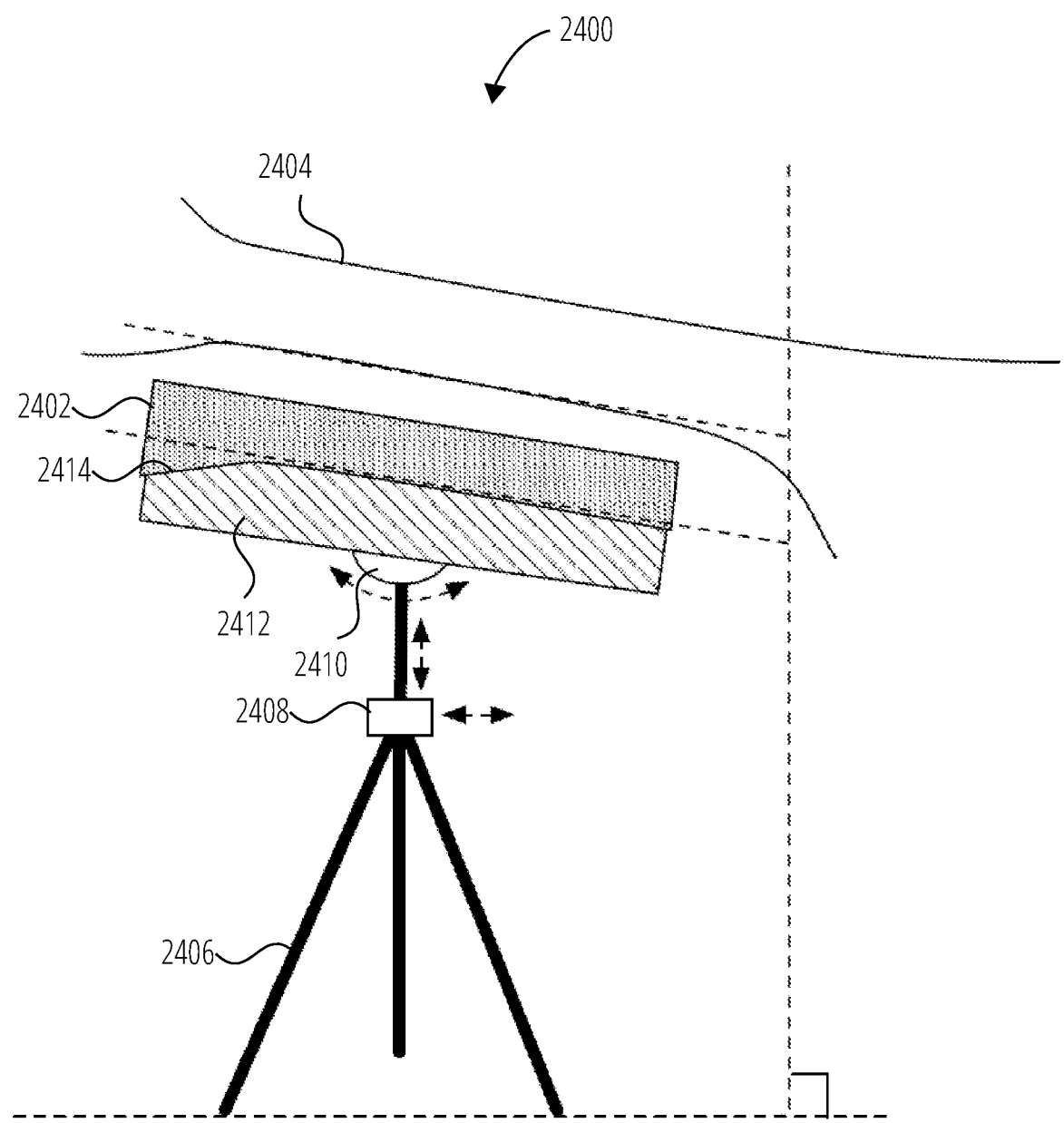
FIG. 24 is a schematic representation of battery loading apparatus according to one example.

FIG. 24 is a schematic representation of battery loading apparatus 2400 according to one example, for inserting a battery pack 2402 into a wing 2404. The battery loading apparatus 2400 in one example includes a base 2406, one or more linear actuators 2408, a tilt mechanism 2410 and a fixture plate 2412.

The battery loading apparatus 2400 can orient the battery pack 2402 or battery module(s) into the appropriate mounting pose. In variants where the battery pack 2402 is mounted to a baseplate prior to assembly, the fixture plate 2412 can include an upper surface 2414 that is a negative of the baseplate curvature, contour and/or retention features (edges, extruded walls, hooks, etc.) to ensure that the battery pack 2402 remains secure during insertion/fastening. In variants, the fixture plate 2412 and/or the rest of the battery loading apparatus 2400 can allow for tool and/or fastener access/clearance to enable assembly. Alternately, the fixture plate and/or battery loading apparatus 2400 can prevent tool access or block line of sight to a portion of the lower surface of the wing 2404 and/or baseplate of the battery pack 2402 (e.g., for variants utilizing adhesives or bonding agents to secure the base plate).

The linear actuators 2408 can include actuators that can operate along both vertical (z-axis) and horizontal (x-y) axes to align the battery with an access hole, raise the battery through an access hole, and move the battery pack inside the wing 2404 as described above with reference to FIG. 23A to FIG. 23C. The actuators comprising the linear actuators 2408 can be of any type (e.g., hydraulic, pneumatic, manual, electrical), can be a compound actuators capable of movement in multiple directions or comprise one or more single direction linear actuators located together or distributed around the battery loading apparatus 2400. In one example, the linear actuator 2408 is only operable vertically while castor wheels are provided on the base 2406 to permit horizontal movement of the fixture plate 2412 and thus battery pack 2402. In another implementations however, an x-y actuator may be provided or the wheels may be motorized to provide horizontal movement of the battery pack 2402 relative to the wing 2404.

The tilt mechanism 2410 provides rotational alignment of the battery pack if required, for example if the battery pack 2402 is inserted into the wing as described above with reference to FIG. 23A to FIG. 23C. The tilt mechanism 2410 can be of any type (e.g., hydraulic, pneumatic, manual, electrical), can be capable of rotation around one or multiple axes as required. The methods and structures described herein provide examples of how a battery pack or battery module may be inserted into a wing or nacelle. However, the battery packs and/or battery modules can otherwise be suitable inserted and/or mounted within a wing or nacelle or other part of the rotorcraft 200.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the examples of the invention disclosed herein without departing from the scope of this invention defined in the following claims.

What is claimed is:

1. An aircraft, comprising:
   a battery pack mounted inside the aircraft;
   a vent coupled between the battery pack and a surface of the aircraft to at least partly define a vent path between the battery pack and the surface of the aircraft;
   a burst membrane located in the vent path; and
   a vent outlet located at one end of the vent path on an upper rear surface of a wing of the aircraft.

2. The aircraft of claim 1, wherein the battery pack is coupled to a fore-aft structure in the wing.

3. The aircraft of claim 1, wherein the vent is coupled to a nacelle.

4. The aircraft of claim 3, wherein an outlet of the vent is coupled to a nacelle facing away from a fuselage of the aircraft.

5. The aircraft of claim 3, wherein the battery pack is coupled to a transverse structure in the nacelle.

6. The aircraft of claim 1, wherein the battery pack comprises battery modules and an enclosure, the battery modules and the enclosure defining paths along which discharge from a thermal event can flow towards the vent.

7. The aircraft of claim 1, further comprising a flexible coupling between the vent and the surface of the aircraft.

8. The aircraft of claim 1, further comprising a fairing over a vent outlet to provide a smooth surface for the vent outlet.

9. The aircraft of claim 1, wherein the burst membrane is selected from the group consisting of a rupture disk, a pressure safety disc, a burst disc, a burst diaphragm and a pressure relief valve.

10. The aircraft of claim 1, further comprising:
    a plurality of wing-mounted battery packs;
    a plurality of nacelle-mounted battery packs,
    a plurality of wing-mounted vents coupled between the wing-mounted battery packs and an external surface of a wing of the aircraft; and
    a plurality of nacelle-mounted vents coupled between the nacelle-mounted battery packs and an external surface of a nacelle of the aircraft.

11. The aircraft of claim 10, wherein the nacelle-mounted battery packs comprise lower and upper rows of battery packs.

12. The aircraft of claim 10, wherein outlets for each of the wing-mounted vents are coupled to the upper rear surface of the wing.

13. The aircraft of claim 12, wherein outlets of the nacelle-mounted vents are coupled to an outboard surface of the nacelle.

14. The aircraft of claim 1, wherein the vent is coupled to the surface via a flexible coupling.

15. The aircraft of claim 14, wherein the flexible coupling is an elastomeric expansion joint that permits relative motion between the battery pack and the surface of the aircraft.

16. The aircraft of claim 2, further comprising:
    a first mounting bracket rigidly attaching one side of the battery pack to the fore-aft structure in the wing; and
    a second mounting bracket attached to another side of the battery pack such that the second mounting bracket provides rotational movement between the battery pack and the first mounting bracket.

17. An aircraft, comprising:
    a battery pack mounted inside the aircraft, the battery pack comprising a number of battery modules and an enclosure surrounding the battery modules;
    a vent coupled between the battery pack and a surface of the aircraft to at least partly define a vent path between the battery pack and the surface of the aircraft;
    a burst membrane located in the vent path; and
    a vent outlet located at one end of the vent path on an upper rear surface of a wing of the aircraft;
    wherein the battery modules and the enclosure define pathways to the vent.

18. The aircraft of claim 17, wherein the vent is a manifold vent coupling a number of battery modules to a surface of the aircraft.

19. The aircraft of claim 17, wherein the vent is positioned to direct discharge from a battery thermal event away from a fuselage of the aircraft.

20. An aircraft, comprising:
    a battery pack mounted inside the aircraft, the battery pack comprising a number of battery modules and an enclosure surrounding the battery modules;
    a vent coupled between the battery pack and a surface of the aircraft to at least partly define a vent path between the battery pack and the surface of the aircraft; and
    a burst membrane located in the vent path,
    wherein the battery modules and the enclosure define pathways to the vent;
    wherein the vent is located on one side of the battery pack and the vent pathways traverse the battery pack from an opposite side of the battery pack to the vent.

* * * * *